US012099625B2

(12) United States Patent
Dillon et al.

(10) Patent No.: US 12,099,625 B2
(45) Date of Patent: Sep. 24, 2024

(54) ORGANIZING, DISCOVERING AND EVALUATING MARKETPLACE DATASETS AND SERVICES BY INDUSTRY BUSINESS NEEDS

(71) Applicant: Snowflake Inc., Bozeman, MT (US)

(72) Inventors: Emily B. Dillon, San Francisco, CA (US); Travis Kaufman, Boise, ID (US); Adil Lalani, Oakland, CA (US); Paul O. Lanzoni, Portsmouth, NH (US); Shakhina Pulatova, San Francisco, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/665,027

(22) Filed: Feb. 4, 2022

(65) Prior Publication Data

US 2023/0252179 A1 Aug. 10, 2023

(51) Int. Cl.
*G06F 21/62* (2013.01)
*G06F 16/2458* (2019.01)
*G06F 16/28* (2019.01)

(52) U.S. Cl.
CPC ...... *G06F 21/6227* (2013.01); *G06F 16/2465* (2019.01); *G06F 16/283* (2019.01); *G06F 2221/2113* (2013.01); *G06F 2221/2141* (2013.01)

(58) Field of Classification Search
CPC ............. G06F 21/6227; G06F 16/2465; G06F 16/283; G06F 2221/2113; G06F 2221/2141
USPC .......................................................... 726/26
See application file for complete search history.

(56) References Cited

U.S. PATENT DOCUMENTS

| | | | |
|---|---|---|---|
| 7,181,493 B2 * | 2/2007 | English | G06Q 50/18 709/204 |
| 7,921,299 B1 * | 4/2011 | Anantha | H04N 21/25875 726/28 |
| 9,141,590 B1 * | 9/2015 | Wheeler | G06F 40/12 |
| 9,461,876 B2 * | 10/2016 | Van Dusen | G06N 20/00 |

(Continued)

OTHER PUBLICATIONS

Samarasinghe et al., "Generating a Domain Model from a Use Case Model", IASEE, 2005 (attached) (Year: 2005).*

*Primary Examiner* — Venkat Perungavoor
*Assistant Examiner* — Peiliang Pan
(74) *Attorney, Agent, or Firm* — Womble Bond Dickinson (US) LLP

(57) ABSTRACT

Embodiments of the present disclosure provide techniques for associating use case data with data listings in a structured manner, thereby allowing for data listings to be organized and/filtered based on use case information. A processing device may provide a listing creation interface that is used to assign a set of use cases to a first data listing and publish the data listing on a data exchange. The data listing is one of a plurality of data listings published on the data exchange and the processing device may provide a data listing interface for displaying the plurality of data listings and an interactable menu including a selectable indication of each of the plurality of use cases. In response to receiving a selection of one or more of the plurality of use cases via the interactable menu, the processing device may display in the data listing interface, each of the plurality of data listings that have been assigned any of the selected one or more use cases.

24 Claims, 12 Drawing Sheets

(56) References Cited

U.S. PATENT DOCUMENTS

| | | | | |
|---|---|---|---|---|
| 9,668,137 | B2* | 5/2017 | Sigurdson | H04W 12/12 |
| 9,706,410 | B2* | 7/2017 | Sreenivas | G06F 21/577 |
| 9,965,743 | B2* | 5/2018 | Sun | G06Q 10/10 |
| 10,198,581 | B2* | 2/2019 | Sreenivas | G06F 21/57 |
| 10,346,901 | B1* | 7/2019 | Serbanescu | G06Q 30/0643 |
| 10,380,366 | B2* | 8/2019 | Bernau | G06F 21/6218 |
| 10,534,851 | B1* | 1/2020 | Chan | G06Q 30/0255 |
| 10,565,638 | B2* | 2/2020 | Karthikeyan | H04L 63/104 |
| 10,592,088 | B2* | 3/2020 | Robinson | G06F 3/04847 |
| 10,726,468 | B2* | 7/2020 | Davis | G06Q 30/0631 |
| 10,776,441 | B1* | 9/2020 | Echeverria | H04L 67/75 |
| 10,986,470 | B2* | 4/2021 | Rivkin | H04W 68/02 |
| 11,049,073 | B2* | 6/2021 | Tzau | G06Q 30/0617 |
| 11,080,336 | B2* | 8/2021 | Van Dusen | G06Q 50/01 |
| 11,138,281 | B2* | 10/2021 | Markman | G06F 16/9536 |
| 11,151,125 | B1* | 10/2021 | Dwivedi | G06F 16/248 |
| 11,157,497 | B1* | 10/2021 | Batsakis | G06F 16/24539 |
| 11,176,218 | B2* | 11/2021 | Kim | G06F 16/906 |
| 11,237,813 | B1* | 2/2022 | Chen | G06F 9/44505 |
| 11,238,049 | B1* | 2/2022 | James | G06F 16/24573 |
| 11,245,789 | B2* | 2/2022 | Karani | H04M 3/42221 |
| 11,263,636 | B2* | 3/2022 | Butler | G06Q 20/385 |
| 11,327,992 | B1* | 5/2022 | Batsakis | H04L 63/083 |
| 11,334,543 | B1* | 5/2022 | Anwar | G06F 16/2228 |
| 11,392,578 | B1* | 7/2022 | James | G06F 21/00 |
| 11,397,865 | B2* | 7/2022 | Lee | G06Q 10/02 |
| 11,416,465 | B1* | 8/2022 | Anwar | G06F 16/285 |
| 11,436,542 | B2* | 9/2022 | Yan | G06N 20/00 |
| 11,438,283 | B1* | 9/2022 | White | G06F 40/216 |
| 11,652,608 | B2* | 5/2023 | Peterson | G06F 21/6245 |
| | | | | 713/189 |
| 11,706,161 | B2* | 7/2023 | Meyer | H04L 49/35 |
| | | | | 370/252 |
| 11,809,843 | B2* | 11/2023 | Shek | G06F 8/33 |
| 11,856,397 | B2* | 12/2023 | Byrne | H04W 12/08 |
| 2004/0098154 | A1* | 5/2004 | McCarthy | G06Q 10/06 |
| | | | | 700/97 |
| 2006/0156264 | A1* | 7/2006 | Shoji | G06F 30/3323 |
| | | | | 716/102 |
| 2009/0254971 | A1* | 10/2009 | Herz | G06Q 10/10 |
| | | | | 726/1 |
| 2013/0231973 | A1* | 9/2013 | Kanuka | G06Q 10/0633 |
| | | | | 705/7.27 |
| 2015/0066742 | A1* | 3/2015 | Chatterton | G06Q 20/3224 |
| | | | | 705/39 |
| 2015/0332369 | A1* | 11/2015 | Nakane | G06Q 30/0282 |
| | | | | 705/26.61 |
| 2016/0260082 | A1* | 9/2016 | Nichols | H04W 4/33 |
| 2017/0041296 | A1* | 2/2017 | Ford | G06F 21/64 |
| 2018/0375886 | A1* | 12/2018 | Kirti | H04L 67/10 |
| 2020/0311031 | A1* | 10/2020 | Sim-Tang | G06F 21/6245 |
| 2021/0035124 | A1* | 2/2021 | Morton | G06F 16/00 |
| 2021/0141926 | A1* | 5/2021 | Ferrer | G06V 10/454 |
| 2021/0144149 | A1* | 5/2021 | Simons | H04L 9/0618 |
| 2021/0144517 | A1* | 5/2021 | Guim Bernat | H04L 9/0637 |
| 2021/0209546 | A1* | 7/2021 | Ramachandran | G06F 16/27 |
| 2021/0241926 | A1* | 8/2021 | Chor | H04W 4/70 |
| 2021/0352144 | A1* | 11/2021 | Puleston | H04L 67/1097 |
| 2021/0352478 | A1* | 11/2021 | Hauser | H04W 12/72 |
| 2021/0374198 | A1* | 12/2021 | Zhou | G06N 3/045 |
| 2022/0014466 | A1* | 1/2022 | Doshi | H04L 63/0471 |
| 2022/0121708 | A1* | 4/2022 | Burnett | G06F 16/9017 |
| 2022/0122147 | A1* | 4/2022 | Kobayashi | G06Q 30/0202 |
| 2022/0164828 | A1* | 5/2022 | Hicken | G06Q 30/0255 |
| 2022/0188306 | A1* | 6/2022 | Bigdelu | G06F 16/2425 |
| 2022/0247784 | A1* | 8/2022 | Satish | H04L 63/1433 |
| 2022/0248222 | A1* | 8/2022 | Byrne | H04W 48/18 |
| 2022/0318312 | A1* | 10/2022 | Atallah | G06F 16/9577 |
| 2022/0329993 | A1* | 10/2022 | Rawat | H04W 76/14 |
| 2022/0335340 | A1* | 10/2022 | Moustafa | G06F 9/5005 |
| 2023/0023922 | A1* | 1/2023 | Witchger, Jr. | G06F 21/6245 |
| 2023/0078109 | A1* | 3/2023 | Samuel | G06F 21/6245 |
| | | | | 726/27 |
| 2023/0409294 | A1* | 12/2023 | Shek | G06F 8/33 |

* cited by examiner

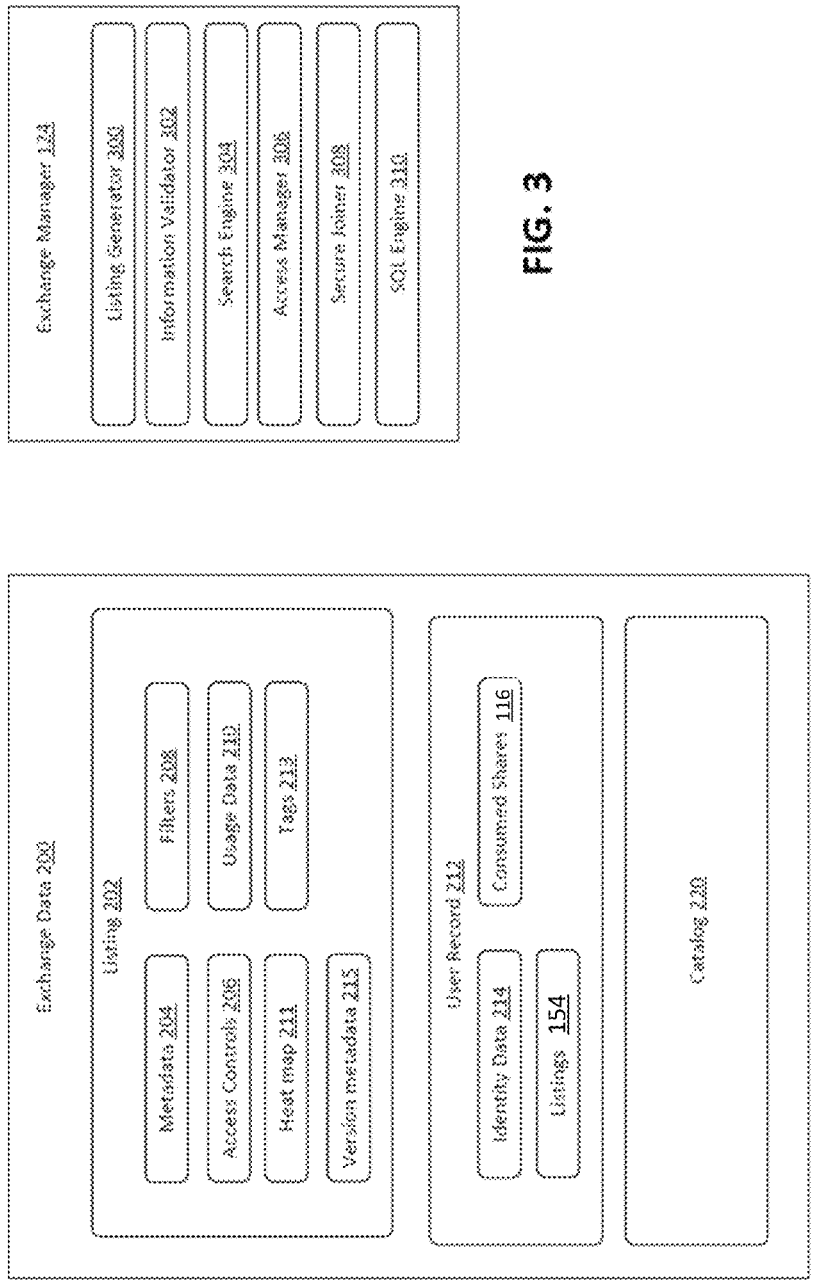

ORGANIZING, DISCOVERING AND EVALUATING MARKETPLACE DATASETS AND SERVICES BY INDUSTRY BUSINESS NEEDS

TECHNICAL FIELD

The present disclosure relates to data sharing platforms, and particularly to organizing and discovering data sets and data services within a data sharing platform.

BACKGROUND

Databases are widely used for data storage and access in computing applications. Databases may include one or more tables that include or reference data that can be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let other parties perform queries against a set of data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2 is a schematic block diagram of data that may be used to implement a public or private data exchange, in accordance with some embodiments of the present invention.

FIG. 3 is a block diagram of a data exchange manager, in accordance with some embodiments of the present disclosure.

DETAILED DESCRIPTION

Figure 1A:
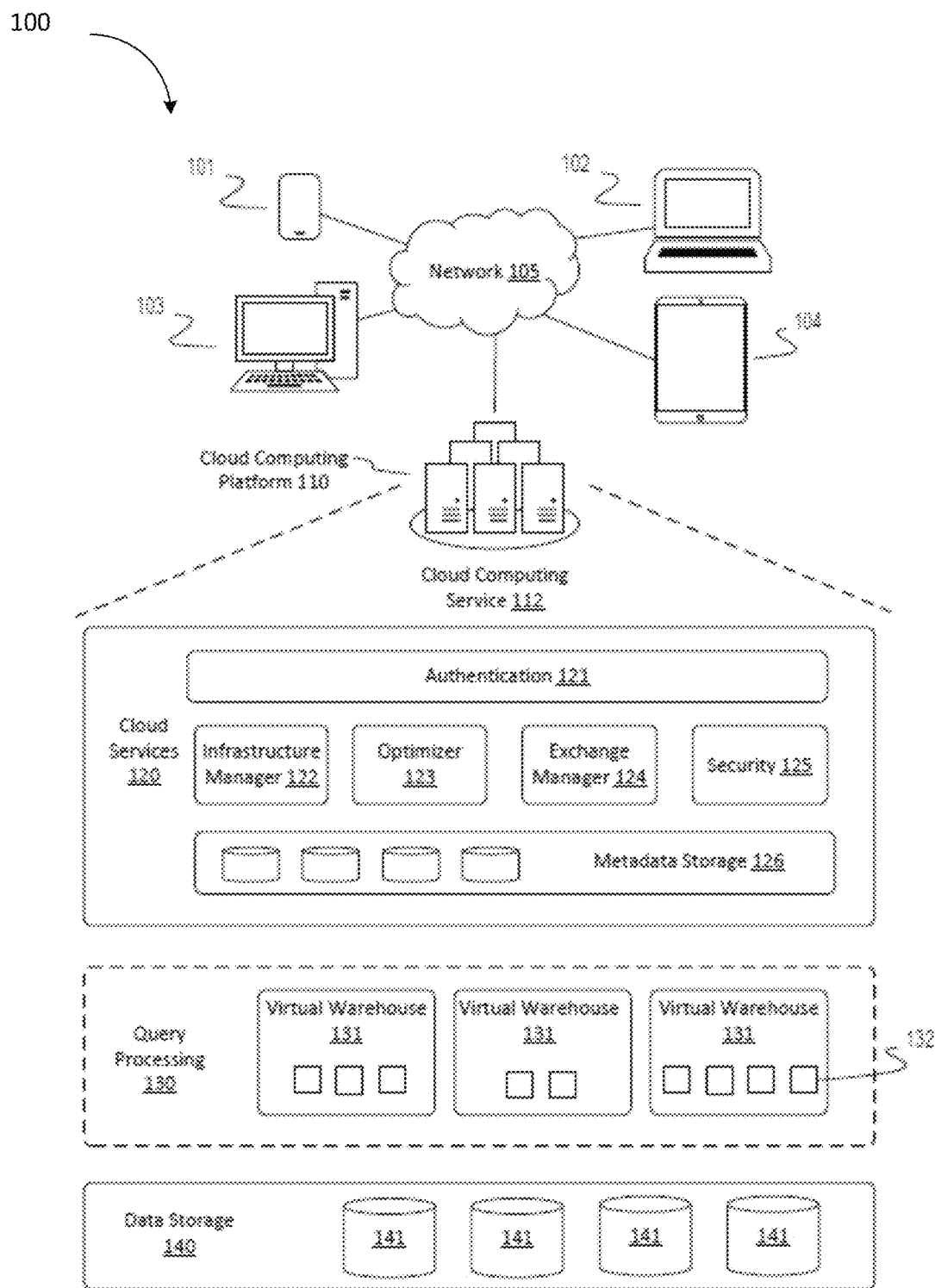
FIG. 1A is a block diagram depicting an example computing environment in which the methods disclosed herein may be implemented, in accordance with some embodiments of the present invention.

Data providers often have data assets that are cumbersome to share, but of interest to another entity. For example, a large online retail company may have a data set that includes the purchasing habits of millions of consumers over the last ten years. If the online retailer wishes to share all or a portion of this data with another entity, the online retailer may need to use old and slow methods to transfer the data, such as a file-transfer-protocol (FTP), or even copying the data onto physical media and mailing the physical media to the other entity. This has several disadvantages. First, it is slow as copying terabytes or petabytes of data can take days. Second, once the data is delivered, the provider cannot control what happens to the data. The recipient can alter the data, make copies, or share it with other parties. Third, the only entities that would be interested in accessing such a large data set in such a manner are large corporations that can afford the complex logistics of transferring and processing the data as well as the high price of such a cumbersome data transfer. Thus, smaller entities (e.g., "mom and pop" shops) or even smaller, more nimble cloud-focused startups are often priced out of accessing this data, even though the data may be valuable to their businesses. This may be because raw data assets are generally too unpolished and full of potentially sensitive data to simply outright sell/provide to other companies. Data cleaning, de-identification, aggregation, joining, and other forms of data enrichment need to be performed by the owner of data before it is shareable with another party. This is time-consuming and expensive. Finally, it is difficult to share data assets with many entities because traditional data sharing methods do not allow scalable sharing for the reasons mentioned above. Traditional sharing methods also introduce latency and delays in terms of all parties having access to the most recently-updated data.

Private and public data exchanges may allow data providers to more easily and securely share their data assets with other entities. A public data exchange (also referred to herein as a "Snowflake data marketplace," or a "data marketplace") may provide a centralized repository with open access where a data provider may publish and control live and read-only data sets to thousands of consumers. A private data exchange (also referred to herein as a "data exchange") may be under the data provider's brand, and the data provider may control who can gain access to it. The data exchange may be for internal use only, or may also be opened to consumers, partners, suppliers, or others. The data provider may control what data assets are listed as well as control who has access to which sets of data. This allows for a seamless way to discover and share data both within a data provider's organization and with its business partners.

The data exchange may be facilitated by a cloud computing service such as the SNOWFLAKE™ cloud computing service, and allows data providers to offer data assets directly from their own online domain (e.g., website) in a private online marketplace with their own branding. The data exchange may provide a centralized, managed hub for an entity to list internally or externally-shared data assets, inspire data collaboration, and also to maintain data governance and to audit access. With the data exchange, data providers may be able to share data without copying it between companies. Data providers may invite other entities to view their data listings, control which data listings appear in their private online marketplace, control who can access data listings and how others can interact with the data assets connected to the listings. This may be thought of as a "walled garden" marketplace, in which visitors to the garden must be approved and access to certain listings may be limited.

As an example, Company A has collected and analyzed the consumption habits of millions of individuals in several different categories. Their data sets may include data in the following categories: online shopping, video streaming, electricity consumption, automobile usage, internet usage, clothing purchases, mobile application purchases, club memberships, and online subscription services. Company A may desire to offer these data sets (or subsets or derived products of these data sets) to other entities, thus becoming a Data Supplier or Data Provider. For example, a new clothing brand may wish to access data sets related to consumer clothing purchases and online shopping habits. Company A may support a page on its website that is or functions substantially similar to a data exchange, where a data consumer (e.g., the new clothing brand) may browse, explore, discover, access and potentially purchase data sets directly from Company A. Further, Company A may control: who can enter the data exchange, the entities that may view a particular listing, the actions that an entity may take with respect to a listing (e.g., view only), and any other suitable action. In addition, a data provider may combine its own data with other data sets from, e.g., a public data exchange (also referred to as a "data marketplace"), and create new listings using the combined data.

A data exchange may be an appropriate place to discover, assemble, clean, and enrich data to make it more monetizable. A large company on a data exchange may assemble data from across its divisions and departments, which could become valuable to another company. In addition, participants in a private ecosystem data exchange may work together to join their datasets together to jointly create a useful data product that any one of them alone would not be able to produce. Once these joined datasets are created, they may be listed on the data exchange or on the data marketplace.

Sharing data may be performed when a data provider creates a share object (hereinafter referred to as a share) of a database in the data provider's account and grants the share access to particular objects (e.g., tables, secure views, and secure user-defined functions (UDFs)) of the database. Then, a read-only database may be created using information provided in the share. Access to this database may be controlled by the data provider. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. The consumer accounts with which the database and its objects are shared may be indicated by a list of references to those consumer accounts contained within the share object. Only those consumer accounts that are specifically listed in the share object may be allowed to look up, access, and/or import from this share object. By modifying the list of references of other consumer accounts, the share object can be made accessible to more accounts or be restricted to fewer accounts.

In some embodiments, each share object contains a single role. Grants between this role and objects define what objects are being shared and with what privileges these objects are shared. The role and grants may be similar to any other role and grant system in the implementation of role-based access control. By modifying the set of grants attached to the role in a share object, more objects may be shared (by adding grants to the role), fewer objects may be shared (by revoking grants from the role), or objects may be shared with different privileges (by changing the type of grant, for example to allow write access to a shared table object that was previously read-only). In some embodiments, share objects in a provider account may be imported into the target consumer account using alias objects and cross-account role grants.

When data is shared, no data is copied or transferred between users. Sharing is accomplished through the cloud computing services of a cloud computing service provider such as SNOWFLAKE'. Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share).

A data exchange may also implement role-based access control to govern access to objects within consumer accounts using account level roles and grants. In one embodiment, account level roles are special objects in a consumer account that are assigned to users. Grants between these account level roles and database objects define what privileges the account level role has on these objects. For example, a role that has a usage grant on a database can "see" this database when executing the command "show databases"; a role that has a select grant on a table can read from this table but not write to the table. The role would need to have a modify grant on the table to be able to write to it.

Consumers of data often require the ability to perform various functions on data that has been shared with them. This often involves a consumer having to share data with one or more third parties, having those third parties run a service on it, and sending the results back to the consumer. In addition to the latency created as a result of having to utilize a third party service, consumers are required to share their potentially sensitive data with these third parties.

Embodiments of the present disclosure address the above noted and other problems by enabling users of a data marketplace to build native applications that can be shared with other users of the data marketplace. The native applications can be published and discovered in the data marketplace like any other data listing, and consumers can install them in their local data marketplace account to serve their data processing needs. This helps to bring data processing services and capabilities to consumers instead of requiring a consumer to share data with e.g., a service provider who can perform these data processing services and share the processed data back to the consumer. Stated differently, instead of a consumer having to share potentially sensitive data with a third party who can perform the necessary data processing services and send the results back to the consumer, the desired data processing functionality may be encapsulated, and then shared with the consumer so that the consumer does not have to share their potentially sensitive data. Embodiments of the present disclosure also protect providers, who may not want underlying details (e.g., source code) of their applications to be shared.

FIG. 1A is a block diagram of an example computing environment 100 in which the systems and methods disclosed herein may be implemented. In particular, a cloud computing platform 110 may be implemented, such as Amazon Web Services™ (AWS), Microsoft Azure™, Google Cloud™, or the like. As known in the art, a cloud computing platform 110 provides computing resources and storage resources that may be acquired (purchased) or leased and configured to execute applications and store data.

The cloud computing platform 110 may host a cloud computing service 112 that facilitates storage of data on the cloud computing platform 110 (e.g. data management and access) and analysis functions (e.g. SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as Amazon S3™ to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution within elastic clusters of virtual machines, referred to herein as virtual warehouses or data warehouses. Thus, query processing 130 may include one or more virtual warehouses 131, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse that expands, contracts, or shuts down according to the user's needs. Expanding a virtual warehouse involves generating one or more compute nodes 132 to a virtual warehouse 131. Contracting a virtual warehouse involves removing one or more compute nodes 132 from a virtual warehouse 131. More compute nodes 132 may lead to faster compute times. For example, a data load which takes fifteen hours on a system with four nodes might take only two hours with thirty-two nodes.

Cloud services 120 may be a collection of services that coordinate activities across the cloud computing service 112. These services tie together all of the different components of the cloud computing service 112 in order to process user requests, from login to query dispatch. Cloud services 120 may operate on compute instances provisioned by the cloud computing service 112 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, authentication engine 121, infrastructure manager 122, optimizer 123, exchange manager 124, security engine 125, and metadata storage 126.

Figure 1B:
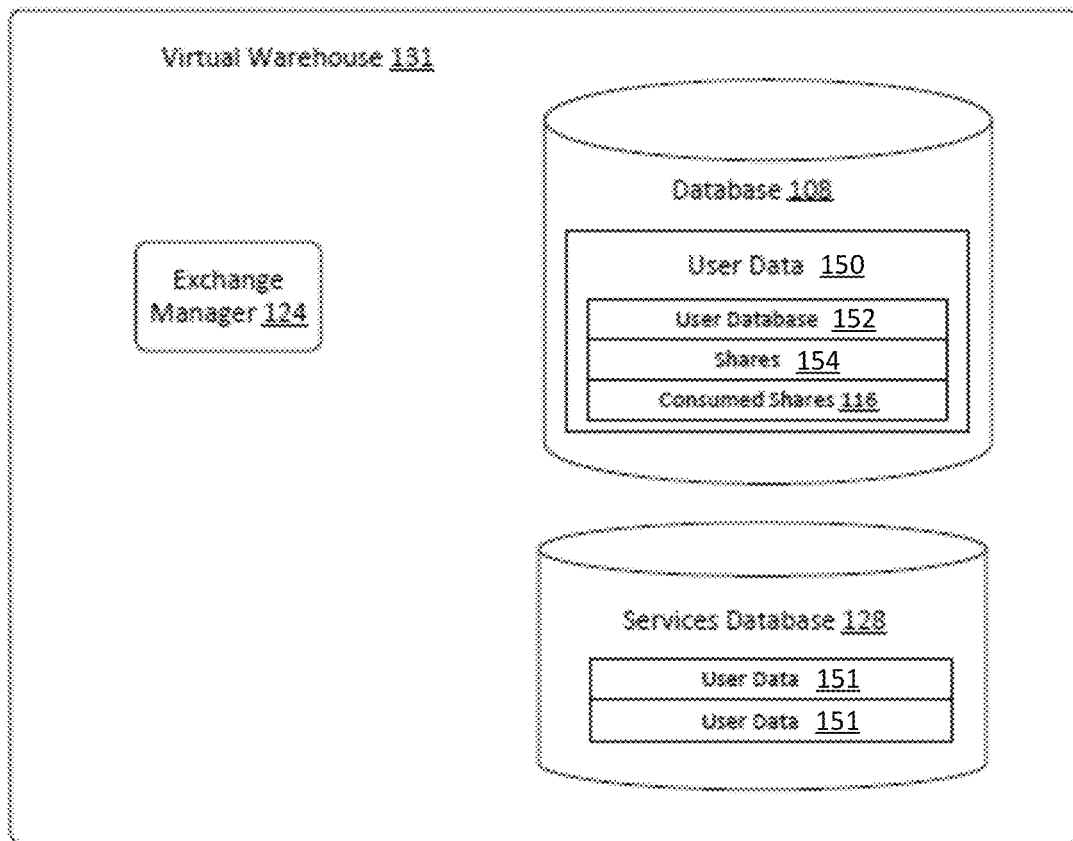
FIG. 1B is a block diagram illustrating an example virtual warehouse, in accordance with some embodiments of the present invention.

FIG. 1B is a block diagram illustrating an example virtual warehouse 131. The exchange manager 124 may facilitate the sharing of data between data providers and data consumers, using, for example, a data exchange. For example, cloud computing service 112 may manage the storage and access of a database 108. The database 108 may include various instances of user data 150 for different users, e.g. different enterprises or individuals. The user data 150 may include a user database 152 of data stored and accessed by that user. The user database 152 may be subject to access controls such that only the owner of the data is allowed to change and access the user database 152 upon authenticating with the cloud computing service 112. For example, data may be encrypted such that it can only be decrypted using decryption information possessed by the owner of the data. Using the exchange manager 124, specific data from a user database 152 that is subject to these access controls may be shared with other users in a controlled manner according to the methods disclosed herein. In particular, a user may specify shares 154 that may be shared in a public or data exchange in an uncontrolled manner or shared with specific other users in a controlled manner as described above. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. When data is shared, no data is copied or transferred between users. Sharing is accomplished through the cloud services 120 of cloud computing service 112.

Sharing data may be performed when a data provider creates a share of a database in the data provider's account and grants access to particular objects (e.g., tables, secure views, and secure user-defined functions (UDFs)). Then a read-only database may be created using information provided in the share. Access to this database may be controlled by the data provider.

Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share). A secure join may be performed as described in U.S. application Ser. No. 16/368,339, filed Mar. 18, 2019.

User devices 101-104, such as laptop computers, desktop computers, mobile phones, tablet computers, cloud-hosted computers, cloud-hosted serverless processes, or other computing processes or devices may be used to access the virtual warehouse 131 or cloud service 120 by way of a network 105, such as the Internet or a private network.

In the description below, actions are ascribed to users, particularly consumers and providers. Such actions shall be understood to be performed with respect to devices 101-104 operated by such users. For example, notification to a user may be understood to be a notification transmitted to devices 101-104, an input or instruction from a user may be understood to be received by way of the user's devices 101-104, and interaction with an interface by a user shall be understood to be interaction with the interface on the user's devices 101-104. In addition, database operations (joining, aggregating, analysis, etc.) ascribed to a user (consumer or provider) shall be understood to include performing of such actions by the cloud computing service 112 in response to an instruction from that user.

FIG. 2 is a schematic block diagram of data that may be used to implement a public or data exchange in accordance with an embodiment of the present invention. The exchange manager 124 may operate with respect to some or all of the illustrated exchange data 200, which may be stored on the platform executing the exchange manager 124 (e.g., the cloud computing platform 110) or at some other location. The exchange data 200 may include a plurality of listings 202 describing data that is shared by a first user ("the provider"). The listings 202 may be listings in a data exchange or in a data marketplace. The access controls, management, and governance of the listings may be similar for both a data marketplace and a data exchange.

The listing 202 may include access controls 206, which may be configurable to any suitable access configuration. For example, access controls 206 may indicate that the shared data is available to any member of the private exchange without restriction (an "any share" as used elsewhere herein). The access controls 206 may specify a class of users (members of a particular group or organization) that are allowed to access the data and/or see the listing. The access controls 206 may specify that a "point-to-point" share in which users may request access but are only allowed access upon approval of the provider. The access controls 206 may specify a set of user identifiers of users that are excluded from being able to access the data referenced by the listing 202.

Figure 4:
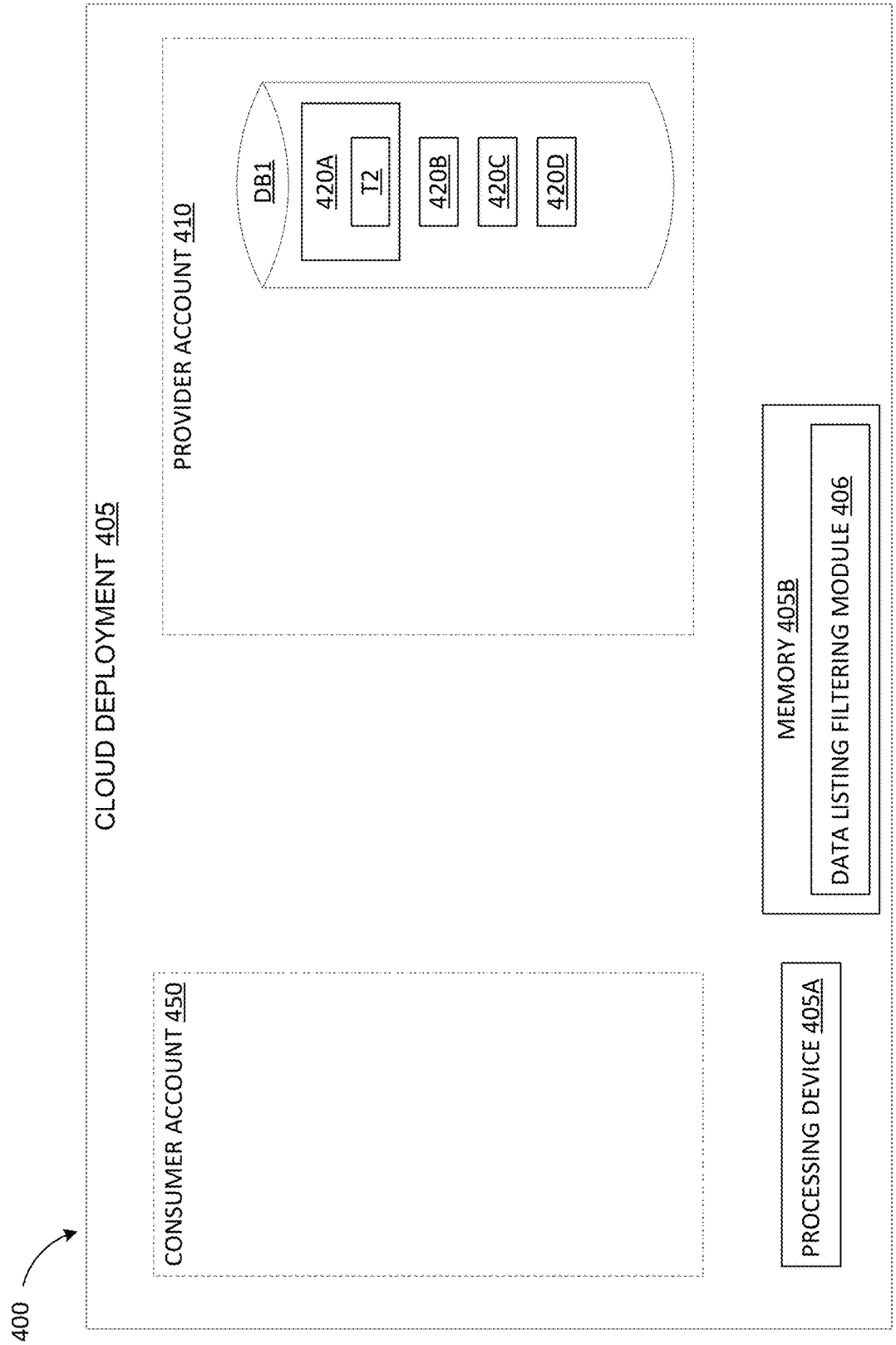
FIG. 4 is a schematic block diagram of deployment of a data exchange that illustrates consumer and provider managed data sharing techniques, in accordance with some embodiments of the present invention.

Note that some listings 202 may be discoverable by users without further authentication or access permissions whereas actual accesses are only permitted after a subsequent authentication step (see discussion of FIGS. 4 and 6). The access controls 206 may specify that a listing 202 is only discoverable by specific users or classes of users.

Note also that a default function for listings 202 is that the data referenced by the share is not exportable by the consumer. Alternatively, the access controls 206 may specify that this is not permitted. For example, access controls 206 may specify that secure operations (secure joins and secure functions as discussed below) may be performed with respect to the shared data such that viewing and exporting of the shared data is not permitted.

In some embodiments, once a user is authenticated with respect to a listing 202, a reference to that user (e.g., user identifier of the user's account with the virtual warehouse 131) is added to the access controls 206 such that the user will subsequently be able to access the data referenced by the listing 202 without further authentication.

The listing 202 may define one or more filters 208. For example, the filters 208 may define specific identity data 214 (also referred to herein as user identifiers) of users that may view references to the listing 202 when browsing the catalog 220. The filters 208 may define a class of users (users of a certain profession, users associated with a particular company or organization, users within a particular geographical area or country) that may view references to the listing 202 when browsing the catalog 220. In this manner, a private exchange may be implemented by the exchange manager 124 using the same components. In some embodiments, an excluded user that is excluded from accessing a listing 202, i.e. adding the listing 202 to the consumed shares 116 of the excluded user, may still be permitted to view a representation of the listing when browsing the catalog 220 and may further be permitted to request access to the listing 202 as discussed below. Requests to access a listing by such excluded users and other users may be listed in an interface presented to the provider of the listing 202. The provider of the listing 202 may then view demand for access to the listing and choose to expand the filters 208 to permit access to excluded users or classes of excluded users (e.g., users in excluded geographic regions or countries).

Filters 208 may further define what data may be viewed by a user. In particular, filters 208 may indicate that a user that selects a listing 202 to add to the consumed shares 116 of the user is permitted to access the data referenced by the listing but only a filtered version that only includes data associated with the identifier 214 of that user, associated with that user's organization, or specific to some other classification of the user. In some embodiments, a private exchange is by invitation: users invited by a provider to view listings 202 of a private exchange are enabled to do by the exchange manager 124 upon communicating acceptance of an invitation received from the provider.

In some embodiments, a listing 202 may be addressed to a single user. Accordingly, a reference to the listing 202 may be added to a set of "pending shares" that is viewable by the user. The listing 202 may then be added to a group of shares of the user upon the user communicating approval to the exchange manager 124.

The listing 202 may further include usage data 210. For example, the cloud computing service 112 may implement a credit system in which credits are purchased by a user and are consumed each time a user runs a query, stores data, or uses other services implemented by the cloud computing service 112. Accordingly, usage data 210 may record an amount of credits consumed by accessing the shared data. Usage data 210 may include other data such as a number of queries, a number of aggregations of each type of a plurality of types performed against the shared data, or other usage statistics. In some embodiments, usage data for a listing 202 or multiple listings 202 of a user is provided to the user in the form of a shared database, i.e. a reference to a database including the usage data is added by the exchange manager 124 to the consumed shares 116 of the user.

The listing 202 may also include a heat map 211, which may represent the geographical locations in which users have clicked on that particular listing. The cloud computing service 112 may use the heat map to make replication decisions or other decisions with the listing. For example, a data exchange may display a listing that contains weather data for Georgia, USA. The heat map 211 may indicate that many users in California are selecting the listing to learn more about the weather in Georgia. In view of this information, the cloud computing service 112 may replicate the listing and make it available in a database whose servers are physically located in the western United States, so that consumers in California may have access to the data. In some embodiments, an entity may store its data on servers located in the western United States. A particular listing may be very popular to consumers. The cloud computing service 112 may replicate that data and store it in servers located in the eastern United States, so that consumers in the Midwest and on the East Coast may also have access to that data.

The listing 202 may also include one or more tags 213. The tags 213 may facilitate simpler sharing of data contained in one or more listings. As an example, a large company may have a human resources (HR) listing containing HR data for its internal employees on a data exchange. The HR data may contain ten types of HR data (e.g., employee number, selected health insurance, current retirement plan, job title, etc.). The HR listing may be accessible to 100 people in the company (e.g., everyone in the HR department). Management of the HR department may wish to add an eleventh type of HR data (e.g., an employee stock option plan). Instead of manually adding this to the HR listing and granting each of the 100 people access to this new data, management may simply apply an HR tag to the new data set and that can be used to categorize the data as HR data, list it along with the HR listing, and grant access to the 100 people to view the new data set.

The listing 202 may also include version metadata 215. Version metadata 215 may provide a way to track how the datasets are changed. This may assist in ensuring that the data that is being viewed by one entity is not changed prematurely. For example, if a company has an original data set and then releases an updated version of that data set, the updates could interfere with another user's processing of that data set, because the update could have different formatting, new columns, and other changes that may be incompatible with the current processing mechanism of the recipient user. To remedy this, the cloud computing service 112 may track version updates using version metadata 215. The cloud computing service 112 may ensure that each data consumer accesses the same version of the data until they accept an updated version that will not interfere with current processing of the data set.

The exchange data 200 may further include user records 212. The user record 212 may include data identifying the user associated with the user record 212, e.g. an identifier (e.g., warehouse identifier) of a user having user data 151 in service database 128 and managed by the virtual warehouse 131.

The user record 212 may list shares associated with the user, e.g., reference listings 154 created by the user. The user record 212 may list shares consumed by the user, e.g. reference listings 202 created by another user and that have been associated to the account of the user according to the methods described herein. For example, a listing 202 may have an identifier that will be used to reference it in the shares or consumed shares 116 of a user record 212.

The listing 202 may also include metadata 204 describing the shared data. The metadata 204 may include some or all of the following information: an identifier of the provider of the shared data, a URL associated with the provider, a name of the share, a name of tables, a category to which the shared data belongs, an update frequency of the shared data, a catalog of the tables, a number of columns and a number of rows in each table, as well as name for the columns. The metadata 204 may also include examples to aid a user in using the data. Such examples may include sample tables that include a sample of rows and columns of an example table, example queries that may be run against the tables, example views of an example table, example visualizations (e.g., graphs, dashboards) based on a table's data. Other information included in the metadata 204 may be metadata for use by business intelligence tools, text description of data contained in the table, keywords associated with the table to facilitate searching, a link (e.g., URL) to documentation related to the shared data, and a refresh interval indicating how frequently the shared data is updated along with the date the data was last updated.

The metadata 204 may further include category information indicating a type of the data/service (e.g., location, weather), industry information indicating who uses the data/service (e.g., retail, life sciences), and use case information that indicates how the data/service is used (e.g., supply chain optimization, or risk analysis). For instance, retail consumers may use weather data for supply chain optimization. A use case may refer to a problem that a consumer is solving (i.e., an objective of the consumer) such as supply chain optimization. A use case may be specific to a particular industry, or can apply to multiple industries. Any given data listing (i.e., dataset) can help solve one or more use cases, and hence may be applicable to multiple use cases.

Because use case information relates to how data is used, it can be a powerful tool for organizing/searching for data listings as it allows consumers of the data marketplace to explore and find datasets and services based on industry problems they're trying to solve (e.g., supply chain optimization, audience segmentation). However, providers often describe use cases for data listings in an unstructured format, making it hard for consumers to find them. Because there is no standardized representation for such use case information, it is difficult to create data listing filters based on use case information.

Embodiments of the present disclosure solve the above and other problems by enabling providers to assign use case data to data listings in a structured manner, thereby allowing for data listings to be organized and searched/filtered based on use case information in a more effective manner. A processing device may be used to assign to a first data listing, a set of use cases from a plurality of use cases, each of the set of use cases indicating a manner in which data of the first data listing is used. In order to perform this assigning, the processing device may provide a listing creation interface having selectable indications of each of the plurality of use cases and may receive, via the listing creation interface, a selection of the set of use cases assigned to the first data listing (e.g., from the consumer). The first data listing may be published on the data exchange, wherein the first data listing is one of a plurality of data listings published on the data exchange and the processing device may provide a data listing interface comprising a graphical representation of each of the plurality of data listings; and an interactable menu including a selectable indication of each of the plurality of use cases. In response to receiving a selection of one or more of the plurality of use cases via the interactable menu, the processing device may display in the data listing interface, a graphical representation of each of the plurality of data listings that have been assigned any of the selected one or more use cases. The embodiments described herein make it easy for consumers to browse the data exchange based on their business needs in order to find listings that solve those needs. Embodiments of the present disclosure also enable a data exchange operator to learn about consumers' business needs based on their browsing patterns and querying activities (individual and collective), and further personalize their overall data exchange experience (listing recommendations on worksheets, etc.). It should be noted that a "business need" and a "use case" are used interchangeably herein.

The exchange data 200 may further include a catalog 220. The catalog 220 may include a listing of all available listings 202 and may include an index of data from the metadata 204 to facilitate browsing and searching according to the methods described herein. In some embodiments, listings 202 are stored in the catalog in the form of JavaScript Object Notation (JSON) objects.

Note that where there are multiple instances of the virtual warehouse 131 on different cloud computing platforms, the catalog 220 of one instance of the virtual warehouse 131 may store listings or references to listings from other instances on one or more other cloud computing platforms 110. Accordingly, each listing 202 may be globally unique (e.g., be assigned a globally unique identifier across all of the instances of the virtual warehouse 131). For example, the instances of the virtual warehouses 131 may synchronize their copies of the catalog 220 such that each copy indicates the listings 202 available from all instances of the virtual warehouse 131. In some instances, a provider of a listing 202 may specify that it is to be available on only specified one or more computing platforms 110.

In some embodiments, the catalog 220 is made available on the Internet such that it is searchable by a search engine such as the Bing™ search engine or the Google search engine. The catalog may be subject to a search engine optimization (SEO) algorithm to promote its visibility. Potential consumers may therefore browse the catalog 220 from any web browser. The exchange manager 124 may expose uniform resource locators (URLs) linked to each listing 202. This URL may be searchable and can be shared outside of any interface implemented by the exchange manager 124. For example, the provider of a listing 202 may publish the URLs for its listings 202 in order to promote usage of its listing 202 and its brand.

FIG. 3 illustrates various components 300-310 that may be included in the exchange manager 124. One or more of the components 300-310 may be implemented as a software module (that is executed by a processing device), firmware that is included on a processing device, or in any other appropriate manner. A listing generator 300 may provide an interface for creating listings 202. For example, a webpage interface to the virtual warehouse 131 that enables a user on a device 101-104 to select data, e.g. a specific table in user data 150 of the user, for sharing and enter values defining some or all of the metadata 204, access controls 206, and filters 208. In some embodiments, creation may be performed by a user by way of SQL commands in an SQL interpreter executing on the cloud computing platform 110 and accessed by way of a webpage interface on a user device 101-104.

An information validator 302 may validate information provided by a provider when attempting to create a listing 202. Note that in some embodiments the actions ascribed to the information validator 302 may be performed by a human reviewing the information provided by the provider. In other embodiments, these actions are performed automatically. The information validator 302 may perform, or facilitate performing by a human operator of various functions. These functions may include verifying that the metadata 204 is consistent with the shared data to which it references, verifying that the shared data referenced by metadata 204 is not pirated data, personal identification information (PII), personal health information (PHI) or other data from which sharing is undesirable or illegal. The information validator 302 may also facilitate the verification that the data has been updated within a threshold period of time (e.g., within the last twenty-four hours). The information validator 302 may also facilitate verifying that the data is not static or not available from other static public sources. The information validator 302 may also facilitate verifying that the data is more than merely a sample (e.g., that the data is sufficiently complete to be useful). For example, geographically limited data may be undesirable whereas an aggregation of data that is not otherwise limited may still be of use.

The exchange manager 124 may include a search engine 304. The search engine 304 may implement a webpage interface that is accessible by a user on user devices 101-104 in order to invoke searches for search strings with respect to the metadata in the catalog 220, receive responses to searches, and select references to listings 202 in search results for adding to the consumed shares 116 of the user record 212 of the user performing the search. In some embodiments, searches may be performed by a user by way of SQL commands in an SQL interpreter executing on the cloud computing platform 110 and accessed by way of a webpage interface on user devices 101-104. For example, searching for shares may be performed by way of SQL queries against the catalog 220 within the SQL engine 310 discussed below.

The search engine 304 may further implement a recommendation algorithm. For example, the recommendation algorithm could recommend other listings 202 for a user based on other listings in the user's consumed shares 116 or formerly in the user's consumed shares. Recommendations could be based on logical similarity: one source of weather data leads to a recommendation for a second source of weather data. Recommendations could be based on dissimilarity: one listing is for data in one domain (geographic area, technical field, etc.) results in a listing for a different domain to facilitate complete coverage for the user's analysis (different geographic area, related technical field, etc.).

The exchange manager 124 may include an access manager 306. As described above, a user may add a listing 202. This may require authentication with respect to the provider of the listing 202. Once a listing 202 is added to the consumed shares 116 of the user record 212 of a user, the user may be either (a) required to authenticate each time the data referenced by the listing 202 is accessed or (b) be automatically authenticated and allowed to access the data once the listing 202 is added. The access manager 306 may manage automatic authentication for subsequent access of data in the consumed shares 116 of a user in order to provide seamless access of the shared data as if it was part of the user data 150 of that user. To that end, the access manager 306 may utilize the access controls 206 of the listing 202, certificates, tokens, or other authentication material in order to authenticate the user when performing accesses to shared data.

The exchange manager 124 may include a secure joiner 308. The secure joiner 308 manages the integration of shared data referenced by consumed shares 116 of a user with one another, i.e. shared data from different providers, and with a user database 152 of data owned by the user. In particular, the secure joiner 308 may manage the execution of queries and other computation functions with respect to these various sources of data such that their access is transparent to the user. The secure joiner 308 may further manage the access of data to enforce restrictions on shared data, e.g. such that analysis may be performed and the results of the analysis displayed without exposing the underlying data to the consumer of the data where this restriction is indicated by the access controls 206 of a listing 202.

The exchange manager 124 may further include a standard query language (SQL) engine 310 that is programmed to receive queries from a user and execute the query with respect to data referenced by the query, which may include consumed shares 116 of the user and the user database 152 owned by the user. The SQL engine 310 may perform any query processing functionality known in the art. The SQL engine 310 may additionally or alternatively include any other database management tool or data analysis tool known in the art. The SQL engine 310 may define a webpage interface executing on the cloud computing platform 110 through which SQL queries are input and responses to SQL queries are presented.

FIG. 4 illustrates a cloud environment 400 comprising a cloud deployment 405, which may comprise a similar architecture to cloud computing service 112 (illustrated in FIG. 1A) and may be a deployment of a data exchange or data marketplace. Although illustrated with a single cloud deployment, the cloud environment 400 may have multiple cloud deployments which may be physically located in separate remote geographical regions but may all be deployments of a single data exchange or data marketplace. Although embodiments of the present disclosure are described with respect to a data exchange, this is for example purpose only and the embodiments of the present disclosure may be implemented in any appropriate enterprise database system or data sharing platform where data may be shared among users of the system/platform.

The cloud deployment 405 may include hardware such as processing device 405A (e.g., processors, central processing units (CPUs), memory 405B (e.g., random access memory (RAM), storage devices (e.g., hard-disk drive (HDD), solid-state drive (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The cloud deployment 405 may comprise any suitable type of computing device or machine that has a programmable processor including, for example, server computers, desktop computers, laptop computers, tablet computers, smartphones, set-top boxes, etc. In some examples, the cloud deployment 405 may comprise a single machine or may include multiple interconnected machines (e.g., multiple servers configured in a cluster). The memory 405B may include a data listing filtering module 406, which may be executed by processing device 405A in order to perform the functions described herein.

Databases and schemas may be used to organize data stored in the cloud deployment 405 and each database may belong to a single account within the cloud deployment 405. Each database may be thought of as a container having a classic folder hierarchy within it. Each database may be a logical grouping of schemas and a schema may be a logical grouping of database objects (tables, views, etc.). Each schema may belong to a single database. Together, a database and a schema may comprise a namespace. When performing any operations on objects within a database, the namespace is inferred from the current database and the schema that is in use for the session. If a database and schema are not in use for the session, the namespace must be explicitly specified when performing any operations on the objects. As shown in FIG. 4, the cloud deployment 405 may include a provider account 410 including database DB1 having schemas 420A-420D.

FIG. 4 also illustrates share-based access to objects in the provider account 410. The provider account 410 may create a share object, which includes grants to database DB1 and schema 420A, as well as a grant to a table T2 located in schema 420A. The grants on database DB1 and schema 420A may be usage grants and the grant on table T2 may be a select grant. In this case, the table T2 in schema 420A in database DB1 would be shared read-only. The share object may contain a list of references (not shown) to various consumer accounts, including the consumer account 450.

After the share object is created, it may be imported or referenced by consumer account 450 (which has been listed in the share object). Consumer account 450 may run a command to list all available share objects for importing. Only if the share object was created with a reference to the consumer account 450, may the consumer account 450 reveal the share object using the command to list all share objects and subsequently import it. In one embodiment, references to a share object in another account are always qualified by account name. For example, consumer account 450 would reference a share object SH1 in provider account A1 with the example qualified name "A1.SH1." Upon the share object being imported to consumer account 450, an administrator role (e.g., an account level role) of the consumer account 450 may be given a usage grant to the imported database. In this way, a user in account 450 with the administrator role 450A may access data from DB1 that is explicitly shared/included in the share object.

Figure 5A:
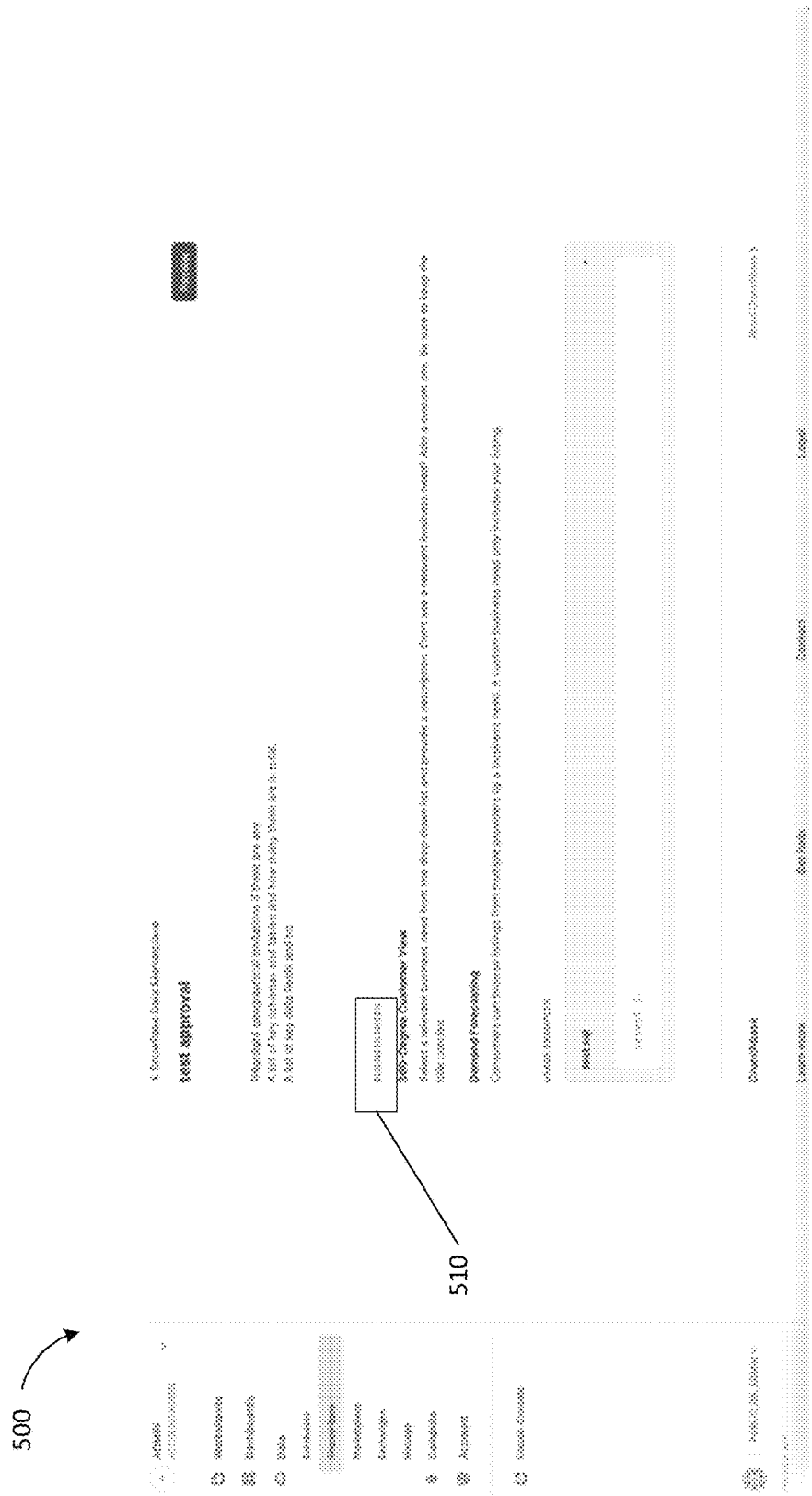
FIGS. 5A-5C illustrates a data listing creation interface of a data exchange, in accordance with some embodiments of the present invention.
Figure 5B:
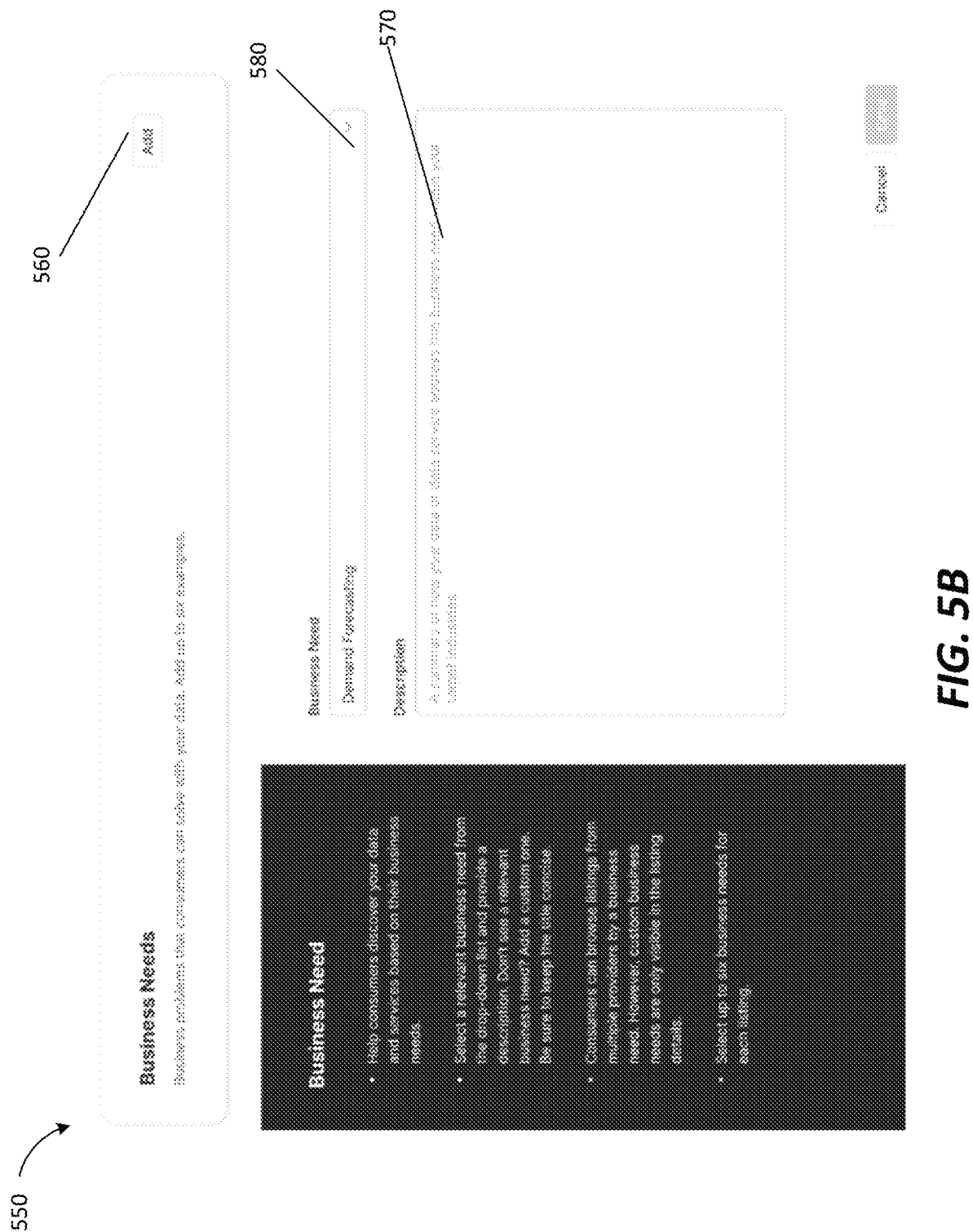

As discussed herein, data that is to be shared via the share object may be represented on the data exchange by a listing as discussed herein with respect to FIG. 2. The deployment 405 may provide a listing creation interface via which the provider account 410 may generate a listing representing the share object and publish the listing on the data exchange. FIG. 5A illustrates an example listing creation interface 500 via which the provider account 410 may specify metadata of the listing including some or all of the information discussed above with respect to FIG. 2 (e.g., usage examples, geographical limitations, schemas and tables included in the shared data) as well as use case information by utilizing the business needs feature 510 shown in FIG. 5A. In some embodiments, the business needs feature 510 of the interface 500 may be interactable (e.g., a button that can be pushed or a link that can be clicked) to launch the business needs specification interface 550 as shown in FIG. 5B. The business needs specification interface 550 may include an interactable "add" feature 560 that may allow the user to select one or more use cases to assign to the data listing from a predefined list of use cases. Use of the add feature 560 may trigger the appearance of a drop down or pop-up menu with the predefined list of use cases from which the user may select. The user may assign up to a threshold number of use cases to each data listing. Although illustrated as six use cases in the example of FIG. 5B, the threshold number of use cases that may be assigned to a data listing may be any appropriate number of use cases.

Each use case may be a tag, selection of which causes the processing device 405A to assign the tag to the data listing the user is generating. The business needs specification interface 550 may further include a drop down menu 580 from which the user may select a use case that has been assigned to the data listing, in order to provide a description of that use case (e.g., " ") using the description feature 570. The description feature 570 may be implemented as an area into which the user may enter text describing the selected use case. In some embodiments, the description of the use case may have a character limit (e.g., a 500-character maximum). Once the user has provided a description for each business need assigned to the data listing they are generating (as well as provided any other metadata for the data listing as necessary), they may publish the data listing on the data exchange. The combination of a use case assigned to a data listing (e.g., in the form of a tag) as well as an accompanying description provides a structured approach to associating use cases with data listings that enables such data to be stored as part of the metadata of the data listing, so that it can become part of the criteria by which data listings may be searched for, as discussed in further detail herein.

Figure 5C:
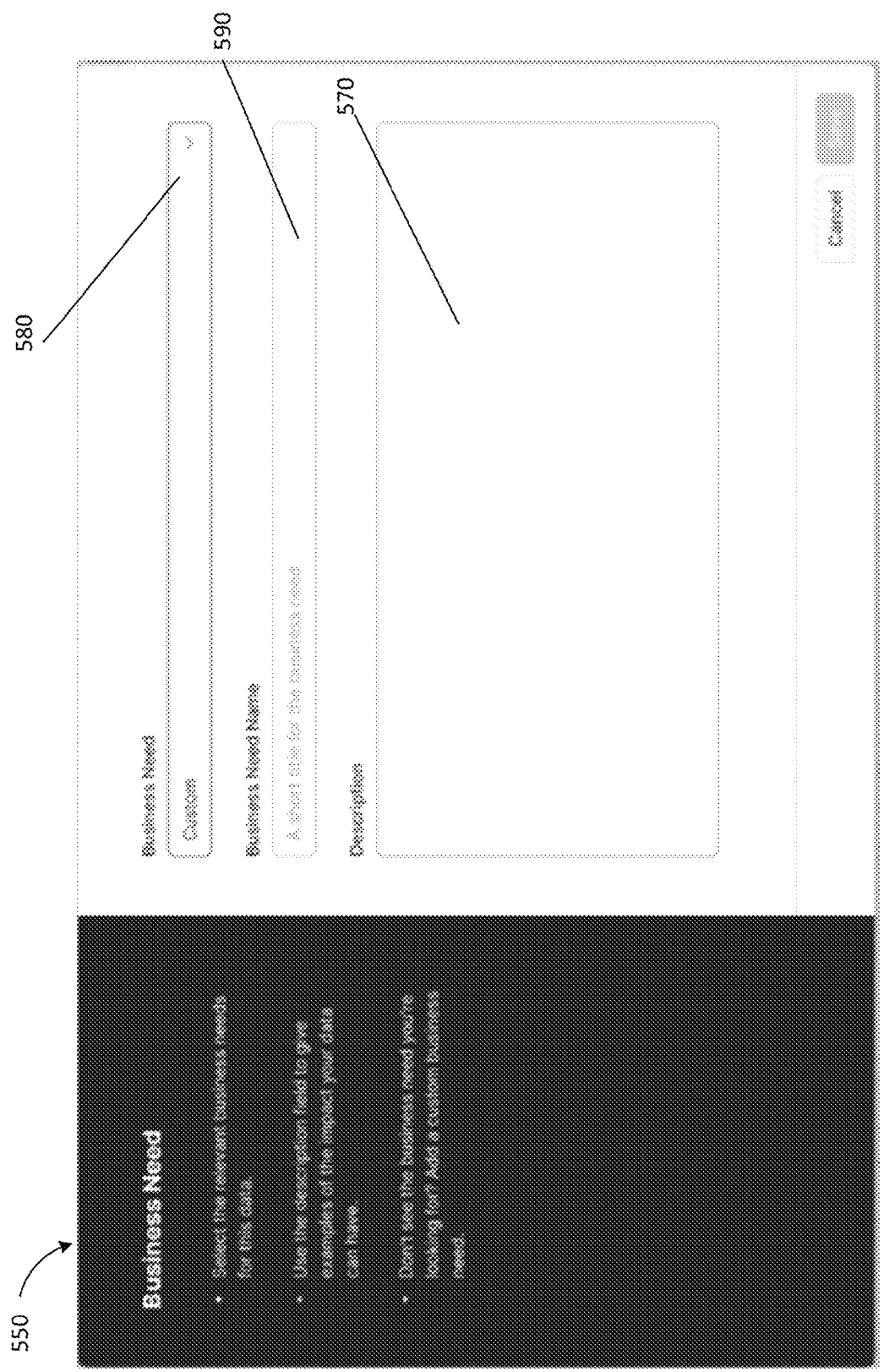

In some embodiments, the menu of pre-defined use cases provided by the add feature 560 may include a custom use case option which the user may select in order to define a custom use case to be added to the data listing. Selection of the custom use case option may trigger display of an area 590 into which the user may enter text for naming the custom use case as shown in FIG. 5C. In some embodiments, the custom use case name may be a phrase or a single word for the use case, and may have a character limit (e.g., a 40-character maximum). In some embodiments, the provider account 410 may not be able to add the same custom use case multiple times for the same data listing 603, and custom use cases must be different from standard (pre-defined) use cases. In response to determining that a user's description of a custom use case has resulted in duplicate use case names, the processing device 405A may display an error message and require the user to input a new use case.

Figure 6A:
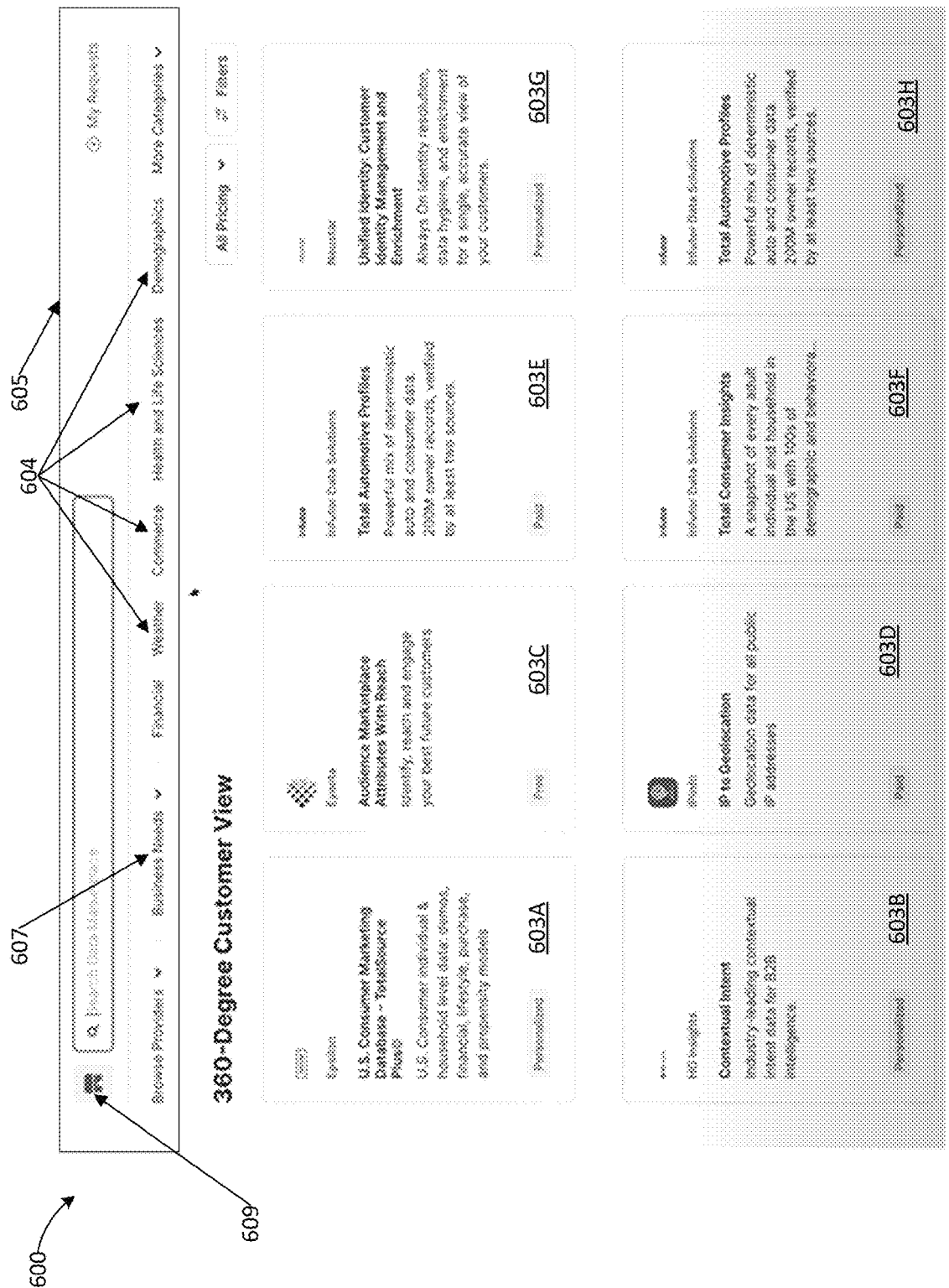
FIGS. 6A-6C illustrates a data listing search interface, in accordance with some embodiments of the present invention.
Figure 6B:
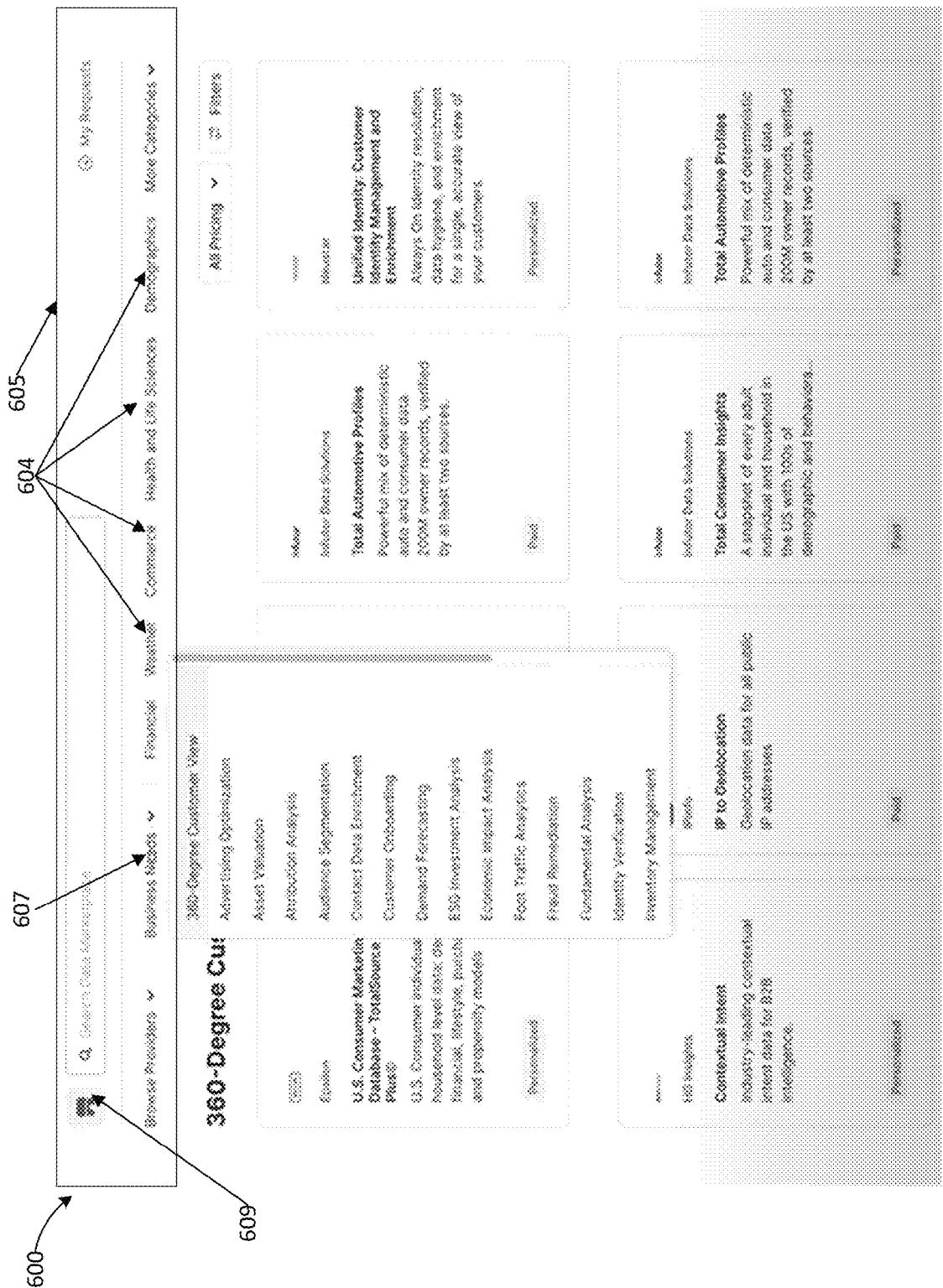
Figure 6C:

FIGS. 6A and 6B illustrate a data listing interface 600 via which the user may navigate the data exchange (e.g., search for/add listings). As discussed herein, the data exchange may include a plurality of published data listings 603A-603H, and the data listing interface 600 may include interactable representations of each of the published data listings 603 (hereinafter referred to as data listings 603) as well as a listing search and filter feature 605. The listing search and filter feature 605 may include a number of different tools for filtering the data listings 603 that are displayed on the data listing interface 600 including a provider drop down menu (to filter data listings 603 by provider), a keyword search bar (to filter data listings 603 by keyword), category filters 604 (to filter data listings 603 by category), and a business needs drop down menu 607 from which the consumer account 450 may select one or more use cases from the pre-defined list of use cases for use as a data listing filter. More specifically, upon selection of one or more use cases from the business needs drop down menu 607, the processing device 405A may remove data listings 603 that are not tagged with any of the selected one or more use cases. In this way, only data listings 603 that have been tagged with at least one of the selected use cases will be displayed in the data listing interface 600. In some embodiments, if the consumer account 450 has selected multiple use cases, the processing device 405A may utilize a logical OR operator when filtering the data listings. For example, if use case A and use case B are selected, the processing device 405A may filter the data listings such that the data listing interface 600 displays data listings tagged with either one or both of use case A and use case B. In another example, a user may select the demand forecasting and foot traffic use cases, resulting in the data listing interface 600 displaying the data listings 603 as shown in FIG. 6C.

As can be seen in FIGS. 6A and 6B, the interactable representation of each of the data listings 603 includes some of the metadata associated with that data listing such as a provider name and a description of the data being shared. The data listing interface 600 may include within the displayed metadata of each published data listing 603, the use cases that the data listing 603 has been tagged with as well as a corresponding description for each use case that the data listing 603 has been tagged with. In some embodiments, each use case included as part of the displayed metadata of a data listing 603 may be interactable such that clicking on the use case immediately applies a filter based on that use case. It should be noted that in some embodiments, custom use cases included as part of the displayed metadata of a data listing 603 may not be interactable (e.g., may be plain text).

As discussed in further detail herein, the processing device 405A may monitor the data quality of each of the data listings 603 for each use case that data listings 603 are tagged with. For example, data listing 603A may be tagged with the demand forecasting and foot traffic use cases, and thus processing device 405A may monitor the data quality of data listing 603A using a data quality score that is based on user feedback indicating how useful/effective the data listing 603A is with respect to the demand forecasting and foot traffic use cases. As the processing device 405A continues to receive user feedback regarding each data listing 603, it may determine which data listings 603 have the highest data quality for each of the use cases. When a consumer interacts with a use case included as part of the displayed metadata of a data listing 603, the processing device 405A may display "featured data listings" corresponding to those data listings 603 that have the highest data quality for that use case. For example, the processing device 405A may display the top 8 (or any appropriate number) data listings 603 by data quality, or may display all data listings 603 that have a data quality score that is above a particular threshold.

The selection of use cases for filtering may be retained (e.g., in terms of stickiness) in a manner similar to selection of categories 604. For example, as a particular set of use cases is selected to create a listing filter, the processing device 405A may generate a uniform resource locator (URL) corresponding to the resulting data listings (referred to herein as a resulting listing URL). More specifically, as each use case of the particular set of use cases is selected, the processing device 405A may add a parameter corresponding to the use case to the result listing URL (e.g., https://app.snowflake.com/marketplace/listings?usecase=21 or https://app.snowflake.com/marketplace/listings?available=true&businessNeedSecondary=%5B%221%22%5D). The result listing URL may be stored for reuse by consumer account 450 or shared with other consumers who are searching for data listings for similar use cases. When shared with certain consumers, the result listing URL may enable those consumers to load/display the data listings that meet the criteria of the filter (i.e., have been tagged with at least one of the selected use cases) without having to select each use case from the business needs drop down menu 607. If the home button 609 is selected, the selected use cases may be discarded and the data listing interface 600 may reset to a default status (e.g., no filters applied and all data listings displayed). The processing device 405A may refine a filter by removing use cases that lead to null results (i.e., use cases that have not been used to tag any listings/have zero listings attached to them) from the filter, but may keep such use cases in the publishing flow. It should be noted that consumers may filter the data listings 603 based on assigned use cases in combination with other criteria such as particular providers, particular categories of data, and others as described herein.

In some embodiments, the business needs drop down menu 607 may provide the user with the ability to search for use case names. In some embodiments, the processing device 405A may infer use cases for data listings (particularly those that don't have any use cases associated) and use the inferred use cases for filtering and searching purposes. Use cases may be inferred based on tags that have been manually applied by e.g., providers of the data exchange or subject matter experts, surveys of consumers regarding their use cases for the listings they're using, and other means. In some embodiments, this data may be used to train a machine learning (ML) classifier to infer use cases.

In addition to the functionality described above, the processing device 405A may execute the data listing filtering module 406 to perform a variety of different analyses in order to provide operators of the data exchange with a number of different data listing metrics. For example, the processing device 405A may determine the number of listings with a particular use case (standard or custom), the percentage of listings that have at least one use case attached (explicit tags by providers), the average number of use cases attached per listing, what percentage of all use cases attached to data listings 603 are standard (pre-defined) vs custom? The processing device 405A may also generate a list of current custom use cases, perform an analysis of the frequency with which various use case filters are applied, perform an analysis of how often filtering data listings 603 by various different use case combinations results in a data listing 603 being imported by a consumer, and perform other data listing analysis by use case including: number of data listing views/requests by use case and most popular data listings by use case, etc.

In addition to the listing metrics provided to the operators of the data exchange, the data listing filtering module 406 may also provide a mechanism by which consumers who have utilized a data listing 603 may score the data listing 603 for each use case that the data listing 603 has been tagged with. This score may be provided to the provider who generated the data listing 603 so that they know how well their data helps consumers solve their different business needs. For example, a provider may tag the data listing 603B with the demand forecasting and foot traffic use cases, and upon being imported by a consumer looking for a data listing 603 to assist with demand forecasting and foot traffic, the consumer may begin to utilize the data/services of the data listing 603B. At some point after the consumer has imported the data listing 603B, the processing device 405A may provide the consumer with a prompt to score the data listing 603B (also referred to herein as a data quality score) based on how useful the data/services of the data listing 603B were with respect to each of the demand forecasting and foot traffic use cases. The prompt may request the consumer to assign the data listing 603B a score within any appropriate scale (e.g., 0-5, 0-10, % out of 100, etc.) for each of the demand forecasting and foot traffic use cases. Over time, as more and more consumers utilize data listing 603B, the aggregated data quality scores for the demand forecasting and foot traffic use cases may give the provider a clearer picture of how well the data of their data listing 603B helps answer questions in the demand forecasting and foot traffic use cases.

The processing device 405A (executing data listing filtering module 406) may over time learn about a consumer's business needs based on their data listing browsing patterns and querying activities (both specific to the consumer and collectively among all consumers of the data exchange) (also referred to herein as "search/interaction history"), and may personalize their data exchange experience using listing recommendations, exploratory landing pages for each business need with relevant content including data services (e.g., applying an industry standard categorization to the data), browsing paths and pre-packaged personalized solution recommendations. A browsing path may comprise suggested guidance on selections to make in the provider, category, and business needs drop down menus of the interface 600, as well as suggested keywords to use in the keyword search bar to filter the data listings 603 and display data listings 603 having desired and/or previously accessed content. A pre-package personalized solution recommendation may include a compilation of data listings 603 that include data sets, data services, and other tools for achieving a particular objective of the consumer.

For example, a consumer representing company X (a winter coat company) may have a search/interaction history that includes (e.g., text or menu-based) searches for and access of data listings having information on types of winter coats that have been sold in the US and sales information (e.g., revenue, demographics) for winter coats sold in the US, sales information for similar winter coats in South America, market analytics for South America and other regions, and services that enhance web pages on which such winter coats are sold. The consumer may then wish to obtain information about expanding company X's winter coat sales to the Nordic region of Europe (e.g., Sweden, Norway, and Finland) and may search for information regarding "expanding sale of winter coats sold in the US/Canada into the Nordic region of Europe." Based on the consumer's search/interaction history, the processing device 405A may personalize the content/information returned. In this example, the processing device 405A may return data sets that are relevant to market analysis for the Nordic region of Europe, buyer demographics that match the current market, associated data enrichment services (e.g., AI/BI tools) used in the current market for web page optimization, and a stack rank of solution partners that can assist with web page optimization plans and processes for the new market. The depth of the response (e.g., number of listings provided,) may be tailored to the consumer's profile within the data exchange.

In another example, the processing device 405A may personalize the content recommendations for the consumer based on the consumer's search/interaction history including previous consumer text searches and menu-based navigation/browsing of data listings. In this example, the consumer (e.g., a data scientist) may wish to refine their predictive AI/BI models by adding new data and data elements to their analytics studio. Based on the consumer's search/interaction history, the processing device 405A may gain a context of their past usage and determine that data and data elements for refining AI/BI models are of interest to the consumer. Thus, if the consumer selects a series of refining options and/or performs a text search (e.g., for data that is designed for AI/BI, Consumer Spending Category>10K, etc.), they may be presented (via the interface 600) with a list of data sets and data services that can be used to refine AI/BI models. The processing device 405A may also allow for the user to "test" a sample of data or service as part of the workflow. In some embodiments, such testing may require payment (e.g., via any appropriate ecommerce platform) or approval by providers (e.g., via an automated approval workflow of an enterprise level case management system).

Figure 7:
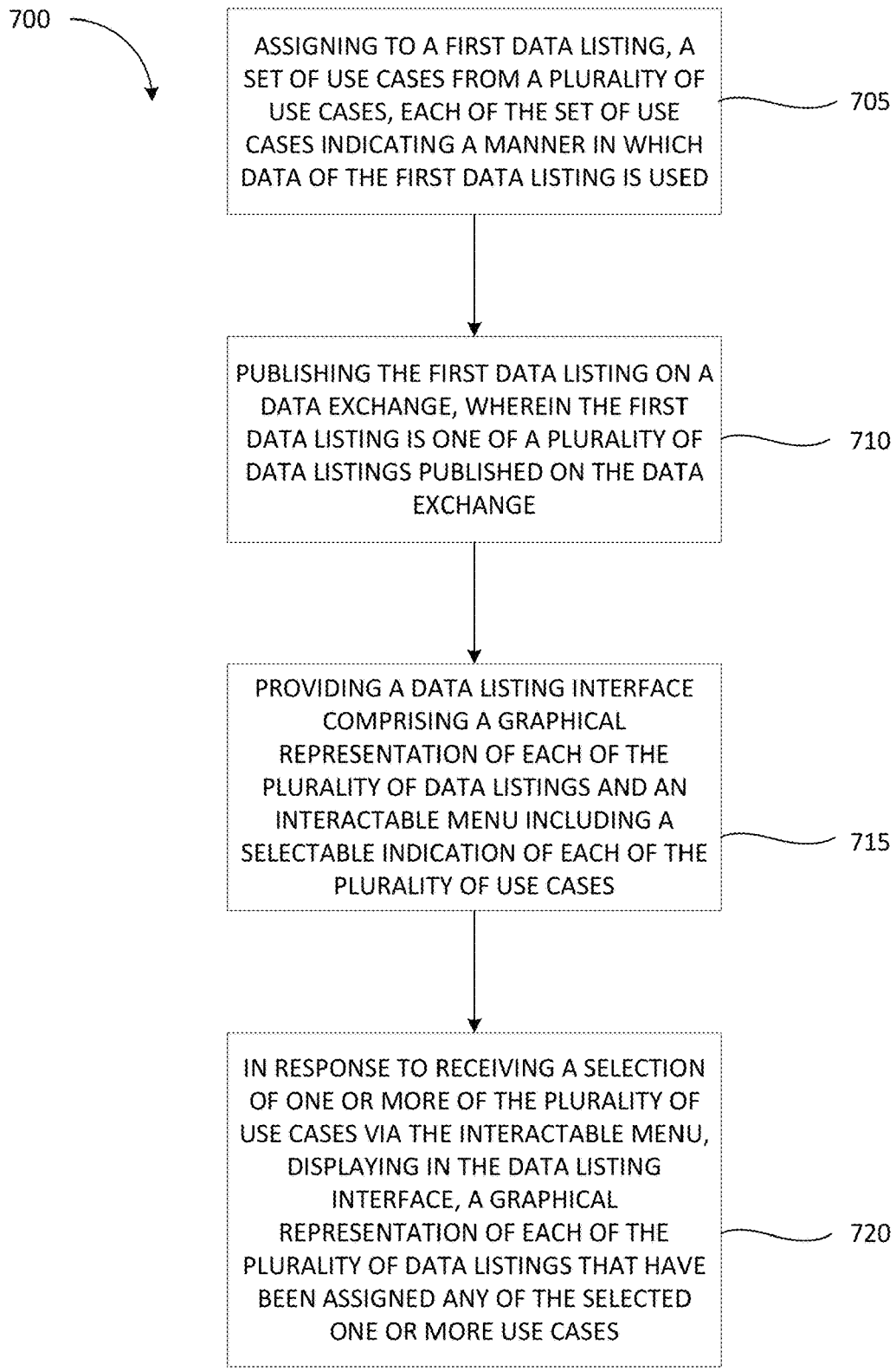
FIG. 7 is a flow diagram of a method for associating use cases with data listings and searching/filtering data listings of a data exchange based on associated use case information, in accordance with some embodiments of the present invention.

FIG. 7 is a flow diagram of a method 700 for enhancing data listings with use case information to facilitate more effective data listing searches, in accordance with some embodiments of the present disclosure. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 700 may be performed by processing device 405A of cloud deployment 405 (illustrated in FIG. 4).

Referring simultaneously to FIGS. 4-6C, the cloud deployment 405 may implement a listing creation interface 500 via which the provider account 410 may specify metadata of the listing including some or all of the information discussed above with respect to FIG. 2 (e.g., usage examples, geographical limitations, schemas and tables included in the shared data) as well as use case information by utilizing the business needs feature 510 shown in FIG. 5A. In some embodiments, the business needs feature 510 of the interface 500 may be interactable (e.g., a button that can be pushed or a link that can be clicked) to launch the business needs specification interface 550 as shown in FIG. 5B. The business needs specification interface 550 may include an interactable "add" feature 560 that may, at block 705, allow the user to select one or more use cases to assign to the data listing from a predefined list of use cases. Use of the add feature 560 may trigger the appearance of a drop down or pop-up menu with the predefined list of use cases from which the user may select. The user may assign up to a threshold number of use cases to each data listing. Although illustrated as six use cases in the example of FIG. 5B, the threshold number of use cases that may be assigned to a data listing may be any appropriate number of use cases.

Each use case may be a tag, selection of which causes the processing device 405A to assign the tag to the data listing the user is generating. The business needs specification interface 550 may further include a drop down menu 580 from which the user may select a use case that has been assigned to the data listing, in order to provide a description of that use case (e.g., " ") using the description feature 570. The description feature 570 may be implemented as an area into which the user may enter text describing the selected use case. In some embodiments, the description of the use case may have a character limit (e.g., a 500-character maximum). At block 710, once the user has provided a description for each business need assigned to the data listing they are generating (as well as provided any other metadata for the data listing as necessary), they may publish the data listing on the data exchange.

At block 715, the processing device 405A may provide a data listing interface 600 (illustrated in FIGS. 6A and 6B) via which the user may navigate the data exchange (e.g., search for/add listings). As discussed herein, the data exchange may include a plurality of published data listings 603A-603H, and the data listing interface 600 may include interactable representations of each of the published data listings 603 (hereinafter referred to as data listings 603) as well as a listing search and filter feature 605. The listing search and filter feature 605 may include a number of different tools for filtering the data listings 603 that are displayed on the data listing interface 600 including a provider drop down menu (to filter data listings 603 by provider), a keyword search bar (to filter data listings 603 by keyword), category filters 604 (to filter data listings 603 by category), and a business needs drop down menu 607 from which the consumer account 450 may select one or more use cases from the pre-defined list of use cases for use as a data listing filter. More specifically, at block 720, upon selection of one or more use cases from the business needs drop down menu 607, the processing device 405A may remove data listings 603 that are not tagged with any of the selected one or more use cases. In this way, only data listings 603 that have been tagged with at least one of the selected use cases will be displayed in the data listing interface 600. In some embodiments, if the consumer account 450 has selected multiple use cases, the processing device 405A may utilize a logical OR operator when filtering the data listings. For example, if use case A and use case B are selected, the processing device 405A may filter the data listings such that the data listing interface 600 displays data listings tagged with either one or both of use case A and use case B.

As can be seen in FIGS. 6A and 6B, the interactable representation of each of the data listings 603 includes some of the metadata associated with that data listing such as a provider name and a description of the data being shared. The data listing interface 600 may include within the displayed metadata of each published data listing 603, the use cases that the data listing 603 has been tagged with as well as a corresponding description for each use case that the data listing 603 has been tagged with. In some embodiments, each use case included as part of the displayed metadata of a data listing 603 may be interactable such that clicking on the use case immediately applies a filter based on that use case. It should be noted that in some embodiments, custom use cases included as part of the displayed metadata of a data listing 603 may not be interactable (e.g., may be plain text).

Figure 8:
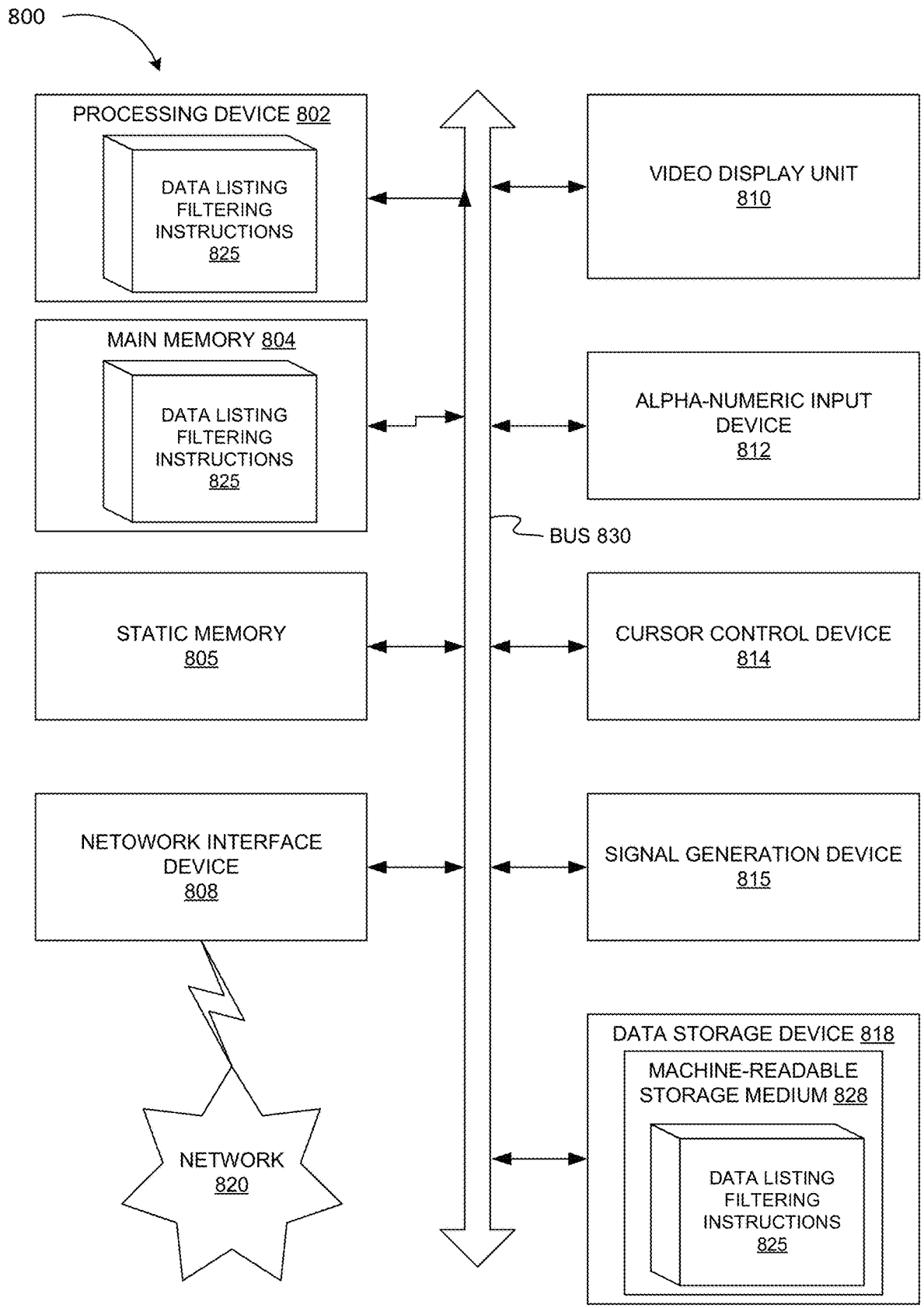
FIG. 8 is a block diagram of an example computing device that may perform one or more of the operations described herein, in accordance with some embodiments of the present invention.

FIG. 8 illustrates a diagrammatic representation of a machine in the example form of a computer system 800 within which a set of instructions, for causing the machine to perform any one or more of the methodologies discussed herein for replicating a share object to a deployment. More specifically, the machine may modify a share object of a first account into a global object wherein the share object includes grant metadata indicating share grants to a set of objects of a database. The machine may create, in a second account located in a deployment, a local replica of the share object on the deployment based on the global object and replicate the set of objects of the database to a local database replica on the deployment; and refresh the share grants to the local replica of the share object.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may be representative of a server.

The exemplary computer system 800 includes a processing device 802, a main memory 804 (e.g., read-only memory (ROM), flash memory, dynamic random access memory (DRAM), a static memory 805 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 800 may further include a network interface device 808 which may communicate with a network 820. The computing device 800 also may include a video display unit 810 (e.g., a liquid crystal display (LCD) or a cathode ray tube (CRT)), an alpha-numeric input device 812 (e.g., a keyboard), a cursor control device 814 (e.g., a mouse) and an acoustic signal generation device 815 (e.g., a speaker). In one embodiment, video display unit 810, alphanumeric input device 812, and cursor control device 814 may be combined into a single component or device (e.g., an LCD touch screen).

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute data listing filtering instructions 825, for performing the operations and steps discussed herein.

The data storage device 818 may include a machine-readable storage medium 828, on which is stored one or more sets of data listing filtering instructions 825 (e.g., software) embodying any one or more of the methodologies of functions described herein. The data listing filtering instructions 825 may also reside, completely or at least partially, within the main memory 804 or within the processing device 802 during execution thereof by the computer system 800; the main memory 804 and the processing device 802 also constituting machine-readable storage media. The data listing filtering instructions 825 may further be transmitted or received over a network 820 via the network interface device 808.

The machine-readable storage medium 828 may also be used to store instructions to perform the methods described herein. While the machine-readable storage medium 828 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "granting," "determining," "publishing," "providing," "designating," "encoding," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   providing a data listing creation interface via which metadata for a first data listing is specified, wherein the first data listing references a data share of a portion of a first database, and wherein the data listing creation interface comprises an interactable user interface component comprising first selectable indications of each of a plurality of use cases for classifying a manner in which data of the data share referenced by the first data listing is used and second selectable indications of one or more categories for classifying a type of the data of the data share referenced by the first data listing;
   receiving, via the data listing creation interface, a first interaction with the first selectable indications that identifies a first selection of a set of the use cases that classify the first data listing and a second interaction with the second selectable indications that identifies a category of the first data listing;
   in response to receiving the the first interaction and the second interaction, generating a first prompt to provide a description of each of the set of use cases assigned to the first data listing;
   assigning, to the first data listing and via the data listing creation interface, the set of use cases from the plurality of use cases and the category;
   publishing the first data listing on a data exchange, wherein the first data listing is one of a plurality of data listings published on the data exchange;
   providing, by a hardware processing device, a data listing interface comprising:
     a first graphical representation of each of the plurality of data listings; and
     an interactable menu including third selectable indications of each of the plurality of use cases;
   personalizing, based on a browsing pattern of a user, the data listing interface with a browsing path, wherein the browsing path comprises:
     suggested guidance on selections to make in at least one of a provider, category, or business needs drop down menu of the data listing creation interface;
     suggested keywords to use in a keyword search bar to filter the data listings; and
     displayed data listings having previously accessed content;
   in response to receiving a second selection of one or more of the plurality of use cases via the interactable menu, determining, by the hardware processing device executing a search engine, that at least one of the second selection of the one or more of the plurality of use cases is within the set of use cases assigned to the first data listing;

displaying in the data listing interface, a second graphical representation of the first data listing as one of each of the plurality of data listings that have been assigned any of the selected one or more of the plurality of use cases;
receiving, via the data listing interface, a third selection of the first data listing; and
in response to receiving the third selection of the first data listing, causing the data of the data share referenced by the first data listing to be imported to an account of an entity.

2. The method of claim 1, wherein a first use case of the plurality of use cases comprises a custom use case, and in response to the set of use cases assigned to the first data listing including the custom use case, generating a prompt to describe the custom use case.

3. The method of claim 1, wherein the first graphical representation of each of the plurality of data listings comprises metadata associated with the data listing including use cases assigned to the data listing.

4. The method of claim 1, further comprising:
as each of the set of use cases is assigned to the first data listing, adding a parameter corresponding to the use case to a uniform resource locator (URL) associated with the first data listing; and
in response to loading the URL, displaying in the data listing interface, a graphical representation of each of the plurality of data listings that have been assigned any of the set of use cases.

5. The method of claim 1, further comprising:
monitoring data listing searches and data listing accesses, wherein a data listing search comprises receiving a selection of use cases to discover data listings of the plurality of data listings that include data or services to fulfill the selected one or more of the plurality of use cases; and
determining one or more data listing metrics based on the monitored data listing searches and data listing accesses.

6. The method of claim 5, further comprising:
monitoring data listing searches made over time by the user to determine a browsing pattern of the user.

7. The method of claim 6, further comprising:
personalizing, based on the browsing pattern of the user, the data listing interface with one or more of: a set of listing recommendations for the user or an exploratory landing page for each of the plurality of use cases within the browsing pattern of the user.

8. The method of claim 5, further comprising:
providing an operator of the data exchange with the one or more data listing metrics, the one or more data listing metrics including: a number of the plurality of data listings with a particular use case, a percentage of the plurality of data listings that have at least one use case of the plurality of use cases assigned, an average number of use cases assigned among the plurality of data listings, and a ratio of pre-defined use cases attached to data listings among the plurality of data listings to custom use cases attached to data listings among the plurality of data listings.

9. A system comprising:
a memory; and
a hardware processing device, operatively coupled to the memory, the hardware processing device to:
provide a data listing creation interface via which metadata for a first data listing is specified, wherein the first data listing references a data share of a portion of a first database, and wherein the data listing creation interface comprises an interactable user interface component comprising first selectable indications of each of a plurality of use cases for classifying a manner in which data of the data share referenced by the first data listing is used and second selectable indications of one or more categories for classifying a type of the data of the data share referenced by the first data listing;
receive, via the data listing creation interface, a first interaction with the first selectable indications that identifies a first selection of a set of the use cases that classify the first data listing and a second interaction with the second selectable indications that identifies a category of the first data listing;
in response to receiving the reception first interaction and the second interaction, generate a first prompt to provide a description of each of the set of use cases assigned to the first data listing;
assign, to the first data listing and via the data listing creation interface, the set of use cases from the plurality of use cases and the category;
publish the first data listing on a data exchange, wherein the first data listing is one of a plurality of data listings published on the data exchange;
provide a data listing interface comprising:
a first graphical representation of each of the plurality of data listings; and
an interactable menu including a third selectable indication of each of the plurality of use cases;
personalize, based on a browsing pattern of a user, the data listing interface with a browsing path, wherein the browsing path comprises:
suggested guidance on selections to make in at least one of a provider, category, or business needs drop down menu of the data listing creation interface;
suggested keywords to use in a keyword search bar to filter the data listings; and
displayed data listings having previously accessed content;
in response to a repcetion of a second selection of one or more of the plurality of use cases via the interactable menu, determine, by executing a search engine, that at least one of the second selection of the one or more of the plurality of use cases is within the set of use cases assigned to the first data listing;
display in the data listing interface, a second graphical representation of the first data listing as one of each of the plurality of data listings that have been assigned any of the selected one or more of the plurality of use cases;
receive, via the data listing interface, a third selection of the first data listing; and
in response to the reception of the third selection of the first data listing, cause the data of the data share referenced by the first data listing to be imported to an account of an entity.

10. The system of claim 9, wherein a first use case of the plurality of use cases comprises a custom use case, and in response to the set of use cases assigned to the first data listing including the custom use case, the hardware processing device is to generate a prompt to describe the custom use case.

11. The system of claim 9, wherein the first graphical representation of each of the plurality of data listings comprises metadata associated with the data listing including use cases assigned to the data listing.

12. The system of claim 9, wherein the hardware processing device is further to:

as each of the set of use cases is assigned to the first data listing, add a parameter corresponding to the use case to a uniform resource locator (URL) associated with the first data listing; and in response to loading the URL, display in the data listing interface, a graphical representation of each of the plurality of data listings that have been assigned any of the set of use cases.

13. The system of claim 9, wherein the hardware processing device is further to:

monitor data listing searches and data listing accesses, wherein a data listing search comprises receiving a selection of use cases to discover data listings of the plurality of data listings that include data or services to fulfill the selected one or more of the plurality of use cases; and determine one or more data listing metrics based on the monitored data listing searches and data listing accesses.

14. The system of claim 13, wherein the hardware processing device is further to:

monitor data listing searches made over time by the user to determine a browsing pattern of the user.

15. The system of claim 14, wherein the hardware processing device is further to:

personalize, based on the browsing pattern of the user, the data listing interface with one or more of: a set of listing recommendations for the user or an exploratory landing page for each of the plurality of use cases within the browsing pattern of the user.

16. The system of claim 13, wherein the hardware processing device is further to:

provide an operator of the data exchange with the one or more data listing metrics, the one or more data listing metrics including: a number of the plurality of data listings with a particular use case, a percentage of the plurality of data listings that have at least one use case of the plurality of use cases assigned, an average number of use cases assigned among the plurality of data listings, and a ratio of pre-defined use cases attached to data listings among the plurality of data listings to custom use cases attached to data listings among the plurality of data listings.

17. A non-transitory computer readable medium having instructions stored thereon which, when executed by a hardware processing device, cause the hardware processing device to:

provide a data listing creation interface via which metadata for a first data listing is specified, wherein the first data listing references a data share of a portion of a first database, and wherein the data listing creation interface comprises an interactable user interface component comprising first selectable indications of each of a plurality of use cases for classifying a manner in which data of the data share referenced by the first data listing is used and second selectable indications of one or more categories for classifying a type of the data of the data share referenced by the first data listing;

receive, via the data listing creation interface, a first interaction with the first selectable indications that identifies a first selection of a set of the use cases that classify the first data listing and a second interaction with the second selectable indications that identifies a category of the first data listing;

in response to the reception of the first interaction and the second interaction, generate a first prompt to provide a description of each of the set of use cases assigned to the first data listing;

assign, to the first data listing and via the data listing creation interface, the set of use cases from the plurality of use cases and the category;

publish the first data listing on a data exchange, wherein the first data listing is one of a plurality of data listings published on the data exchange;

provide, by the hardware processing device, a data listing interface comprising:

a first graphical representation of each of the plurality of data listings; and an interactable menu including a third selectable indication of each of the plurality of use cases;

personalize, based on a browsing pattern of a user, the data listing interface with a browsing path, wherein the browsing path comprises:

suggested guidance on selections to make in at least one of a provider, category, or business needs drop down menu of the data listing creation interface;

suggested keywords to use in a keyword search bar to filter the data listings; and displayed data listings having previously accessed content;

in response to a reception of a second selection of one or more of the plurality of use cases via the interactable menu, determine, by executing a search engine, that at least one of the second selection of the one or more of the plurality of use cases is within the set of use cases assigned to the first data listing;

display in the data listing interface, a second graphical representation of the first data listing as one of each of the plurality of data listings that have been assigned any of the selected one or more of the plurality of use cases; and receive, via the data listing interface, a third selection of the first data listing; and in response to a reception of the third selection of the first data listing, causing the data of the data share referenced by the first data listing to be imported to an account of an entity.

18. The non-transitory computer readable medium of claim 17, wherein a first use case of the plurality of use cases comprises a custom use case, and in response to the set of use cases assigned to the first data listing including the custom use case, the hardware processing device is to generate a prompt to describe the custom use case.

19. The non-transitory computer readable medium of claim 17, wherein the first graphical representation of each of the plurality of data listings comprises metadata associated with the data listing including use cases assigned to the data listing.

20. The non-transitory computer readable medium of claim 17, wherein the hardware processing device is further to:

as each of the set of use cases is assigned to the first data listing, add a parameter corresponding to the use case to a uniform resource locator (URL) associated with the first data listing; and in response to loading the URL, display in the data listing interface, a graphical representation of each of the plurality of data listings that have been assigned any of the set of use cases.

21. The non-transitory computer readable medium of claim 17, wherein the hardware processing device is further to:
   monitor data listing searches and data listing accesses, wherein a data listing search comprises receiving a selection of use cases to discover data listings of the plurality of data listings that include data or services to fulfill the selected one or more of the plurality of use cases; and
   determine one or more data listing metrics based on the monitored data listing searches and data listing accesses.

22. The non-transitory computer readable medium of claim 21, wherein the hardware processing device is further to:
   monitor data listing searches made over time by the user to determine a browsing pattern of the user.

23. The non-transitory computer readable medium of claim 22, wherein the hardware processing device is further to:
   personalize, based on the browsing pattern of the user, the data listing interface with one or more of: a set of listing recommendations for the user or an exploratory landing page for each of the plurality of use cases within the browsing pattern of the user.

24. The non-transitory computer readable medium of claim 21, wherein the hardware processing device is further to:
   provide an operator of the data exchange with the one or more data listing metrics, the one or more data listing metrics including: a number of the plurality of data listings with a particular use case, a percentage of the plurality of data listings that have at least one use case of the plurality of use cases assigned, an average number of use cases assigned among the plurality of data listings, and a ratio of pre-defined use cases attached to data listings among the plurality of data listings to custom use cases attached to data listings among the plurality of data listings.

* * * * *